(12) United States Patent
Ogawa et al.

(10) Patent No.: US 7,289,022 B2
(45) Date of Patent: Oct. 30, 2007

(54) COMMUNICATION SYSTEM AND METHOD FOR COMMUNICATING BETWEEN A TIRE/WHEEL ASSEMBLY AND A VEHICLE BODY

(75) Inventors: Atsushi Ogawa, Toyota (JP); Shinichi Tomioka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 80 days.

(21) Appl. No.: 10/852,748

(22) Filed: May 25, 2004

(65) Prior Publication Data

US 2004/0246117 A1 Dec. 9, 2004

(30) Foreign Application Priority Data

Jun. 5, 2003 (JP) ............................. 2003-160241
Jun. 5, 2003 (JP) ............................. 2003-160242

(51) Int. Cl.
*B60C 23/00* (2006.01)
(52) U.S. Cl. ............. 340/447; 340/426.31; 340/444; 340/472; 340/436; 280/727; 280/734
(58) Field of Classification Search ............... 340/447, 340/442, 426.33, 426.31, 444, 467, 441, 340/438, 472, 487, 436, 425.5; 280/727, 280/734
See application file for complete search history.

(56) References Cited

U.S. PATENT DOCUMENTS

| | | | | |
|---|---|---|---|---|
| 4,348,654 | A | * | 9/1982 | Matsuda et al. ............ 340/448 |
| 4,970,906 | A | * | 11/1990 | Shibata et al. ............. 73/865.8 |
| 5,899,290 | A | * | 5/1999 | Iwata ......................... 180/197 |
| 6,112,587 | A | * | 9/2000 | Oldenettel ................ 73/146.5 |
| 6,237,403 | B1 | | 5/2001 | Oldenettel et al. .......... 340/444 |
| 6,275,148 | B1 | | 8/2001 | Takamura et al. .......... 340/444 |
| 6,278,363 | B1 | * | 8/2001 | Bezek et al. ............... 340/442 |
| 6,334,500 | B1 | * | 1/2002 | Shin .......................... 180/197 |
| 6,346,808 | B1 | * | 2/2002 | Schroeder ............. 324/207.21 |
| 6,430,484 | B1 | * | 8/2002 | Takamura et al. ............ 701/29 |
| 6,538,566 | B1 | * | 3/2003 | Morand et al. ............. 340/444 |
| 6,711,505 | B2 | * | 3/2004 | Nakao .......................... 702/34 |
| 6,965,227 | B2 | * | 11/2005 | Blossfeld .................... 324/166 |

FOREIGN PATENT DOCUMENTS

| | | |
|---|---|---|
| EP | 0 997 326 A2 | 5/2000 |
| EP | 1 026 015 A2 | 8/2000 |
| JP | A 9-240228 | 9/1997 |
| JP | A 10-104103 | 4/1998 |
| JP | A 10-309914 | 11/1998 |
| JP | A 11-20427 | 1/1999 |

(Continued)

*Primary Examiner*—Benjamin C. Lee
*Assistant Examiner*—Daniel Previl
(74) *Attorney, Agent, or Firm*—Oliff & Berridge, PLC

(57) ABSTRACT

A communication system for communicating between a tire/wheel assembly and a body of a vehicle of a construction in which the tire/wheel assembly is supported by the vehicle body, has a i) wheel-side communication device that is mounted to the tire/wheel assembly and rotates together with the tire/wheel assembly, and ii) a body-side communication device that is mounted in a fixed position to the vehicle body. The communication system performs communication between the wheel-side communication device and the body-side communication device according to a predetermined rotational position of the tire/wheel assembly.

21 Claims, 15 Drawing Sheets

FOREIGN PATENT DOCUMENTS

| | | |
|---|---|---|
| JP | A-2001-105811 | 4/2001 |
| JP | A 2002-511812 | 4/2002 |
| JP | A 2002-511813 | 4/2002 |
| JP | A 2002-264618 | 9/2002 |
| JP | A-2003-507231 | 2/2003 |
| JP | A-2004-161113 | 6/2004 |
| JP | A-2004-314893 | 11/2004 |
| WO | WO 01/12453 A1 | 2/2001 |

* cited by examiner

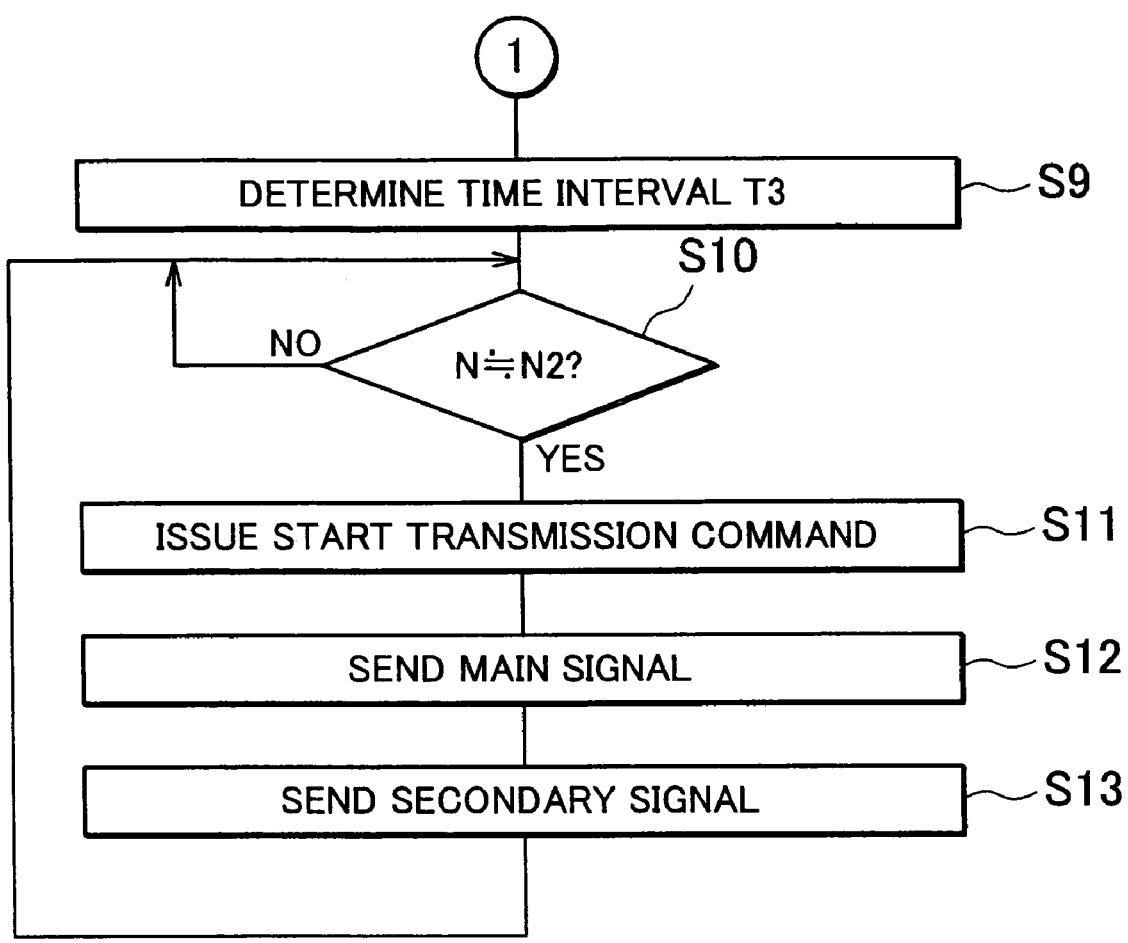

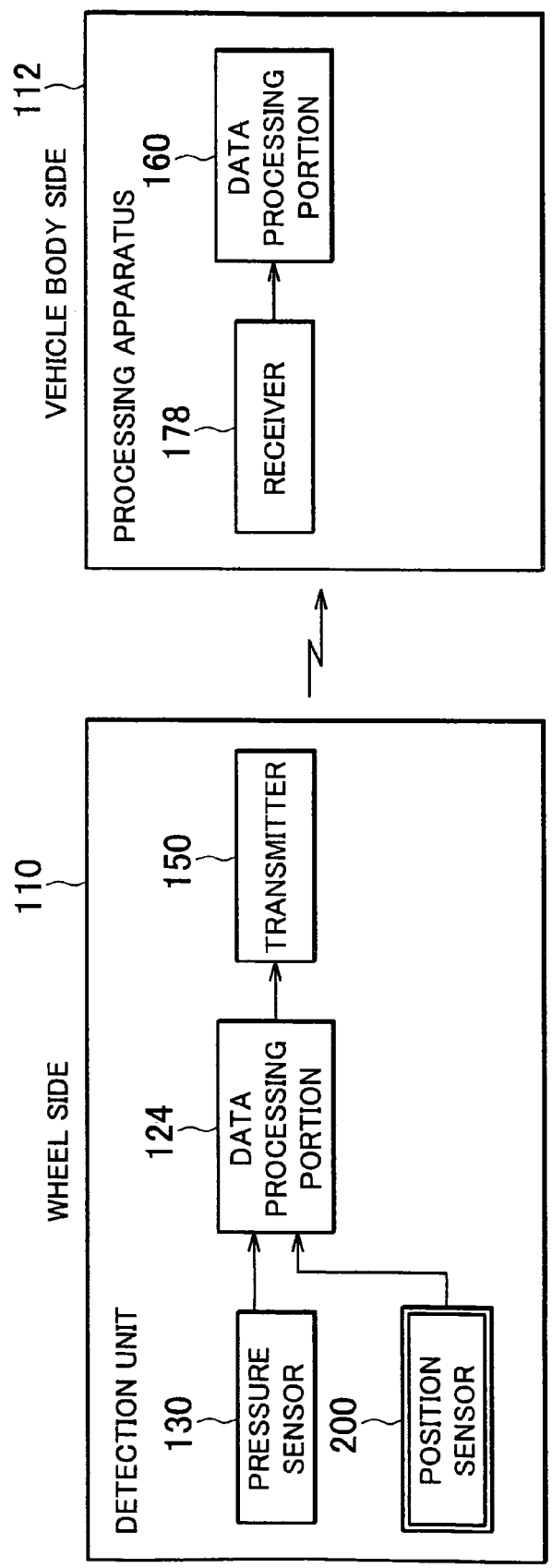

COMMUNICATION SYSTEM AND METHOD FOR COMMUNICATING BETWEEN A TIRE/WHEEL ASSEMBLY AND A VEHICLE BODY

INCORPORATION BY REFERENCE

The disclosure of Japanese Patent Application Nos. 2003-160241 filed on Jun. 5, 2003 and 2003-160242 filed on Jun. 5, 2003, including the specifications, drawings and abstracts are incorporated herein by reference in their entirety.

BACKGROUND OF THE INVENTION

1. Field of the Invention

The invention generally relates to a technology for communicating between a tire/wheel assembly and a body of a vehicle. More specifically, the invention relates to a technology for communicating between a wheel-side communication device mounted on a tire/wheel assembly and a body-side communication device mounted on a vehicle body.

2. Description of the Related Art

Systems are known that establish communication between a tire/wheel assembly (hereinafter simply referred to as "wheel") and a body of a vehicle. One such known system performs communication between a wheel and a vehicle body using a wheel-side communication device mounted on a wheel so that it rotates together with the wheel, and a body-side communication device mounted in a fixed position on the vehicle body.

For example, the system disclosed in JP(A) 10-309914 includes transmitting means mounted to a wheel and receiving means mounted to a vehicle body. The transmitting means detects a tire air pressure of the wheel and transmits a signal indicative thereof, while the receiving means receives the signal sent from the transmitting means and obtains the tire air pressure.

This system also includes a wheel speed sensor mounted on the wheel and determining means mounted on the vehicle body. The wheel speed sensor is fixed in a position near a rotating body, which rotates together with the wheel, and detects the wheel speed. The determining means receives a signal from the wheel speed sensor and determines the tire air pressure state of the wheel based on that signal.

The system further includes a signal wire on the vehicle body, which electronically connects the wheel speed sensor and the determining means together. The signal wire in this system functions as an antenna so that the receiving means can receive the signal sent by the transmitting means. This kind of communication system is also disclosed in JP(A) 11-20427.

With these kinds of technology, the wheel-side communication device is typically mounted in a fixed position on the wheel. As a result, the position of the wheel-side communication device changes as the wheel rotates with respect to the body-side communication device. This change in the relative positional relationship between the wheel-side communication device and the body-side communication device affects the state of communication between the communication devices.

Ideally, a good communication state between the wheel-side communication device and the body-side communication device should be maintained, regardless of the rotational position of the wheel, i.e., the wheel-side communication device. In reality, however, the communication state between the communication devices changes as the relative position between the communication devices changes, as described above.

There are several reasons for this change in the communication state. For example, one reason is that the radio wave transmission path between the communication devices deteriorates as the relative position between them changes due to the fact that the antenna of the communication device is a directional antenna. Another reason is that the distance between the two communication devices changes as the relative position between the communication devices changes. Still another reason is that certain elements of the vehicle temporarily come between the communication devices, at which time these elements act as radio wave interfering objects.

When the communication state between the communication devices changes, the receiving voltage of the communication device may drop below the lowest voltage at which reception is possible during one rotation of the wheel, as shown in the graph in FIG. 15 for example. As a result, there may be a region where communication is poor.

SUMMARY OF THE INVENTION

In view of the foregoing problems, it is an object of this invention to provide a technology for establishing wireless communication between a wheel-side communication device and a body-side communication device in a vehicle, which inhibits deterioration of the communication state due to a change in the relative position between a wheel-side communication device that rotates together with a wheel, and a body-side communication device.

Accordingly, a first aspect of the invention relates to a communication system for communicating between a tire/wheel assembly (hereinafter simply referred to as "wheel") and a vehicle body, which is provided with a wheel-side communication device mounted to the wheel and which rotates together with the wheel, and a body-side communication device mounted in a fixed position to the vehicle body. Communication takes place between the wheel-side communication device and the body-side communication device according to the rotational position of the wheel.

As described above, the reception when one of the wheel-side communication device and the body-side communication device receives a signal from the other changes cyclically as the wheel rotates. There is a pattern between the change in that reception and the change in the rotational position of the wheel, in which the reception improves when the actual rotational position of the wheel matches a specific rotational position. Accordingly, with this system it is possible to selectively perform communication between the wheel-side communication device and the body-side communication device at a rotational position of a wheel, from among a plurality of rotational positions of the wheel, with the exception of a rotational position where the communication state between the communication devices may be poor.

The communication system of the first aspect of the invention may also be provided with i) a rotational position detecting device that detects a rotational position of the tire/wheel assembly, and ii) a transmission timing determining device that determines a communication timing based on the relationship between the rotational position of the wheel detected by the rotational position detecting device and a received signal level, which is the level of a signal received from one of the body-side communication device and the wheel-side communication device by the other.

Further, the body-side transmission timing determining device may also have a level obtaining portion that obtains a received signal level for each one of a plurality of rotational positions detected by the rotational position detecting device. The body-side transmission timing determining device may also determine the body-side transmission timing (or the wheel-side transmission timing) based on a distribution of the plurality of received signal levels, each of which is obtained for a corresponding rotational position.

Moreover, the level obtaining portion may also obtain a received signal level for the rotational position when at least one of i) a rotational speed of the wheel is equal to, or less than, a reference value, and ii) the rotational speed of the wheel is maintained constant.

The body-side communication device transmits a signal from a fixed position while the wheel-side communication device receives the signal while rotating together with the wheel. Therefore, when the rotation speed of the wheel is extremely fast such that the time during which the wheel remains in the same rotational position is very short during communication between the body-side communication device and the wheel-side communication device in order to determine the relationship between the rotational position of the wheel and the received signal level, the portion of time series data indicative of the received signal level that correctly reflects the true received signal level of one rotational position of the wheel is extremely small. This reduces the accuracy with which the received signal level is obtained.

Also, during communication between the body-side communication device and the wheel-side communication device in order to determine the relationship between the rotational position of the wheel and the received signal level, the accuracy with which the obtained value of the received signal level reflects the true value is more stable when the rotational speed of the wheel is maintained constant than when it fluctuates.

Based on this knowledge, the level obtaining portion obtains the received signal level for the rotational position when at least one of i) a rotational speed of the wheel is equal to, or less than, a reference value, and ii) the rotational speed of the wheel is maintained constant.

Further, the body-side transmission timing determining device in the first aspect of the invention may also include i) a position determining portion that determines, as the optimum receiving position for the wheel-side communication device, the rotational position for which the substantially highest value was obtained from among the plurality of received signal levels obtained for each of rotational position, and ii) a timing determining portion that determines the body-side transmission timing to be a timing at which the wheel-side communication device receives a signal from the body-side communication device when the actual rotational position of the wheel substantially matches the determined optimum receiving position.

Accordingly, it is possible to determine the optimum receiving position at which the wheel-side communication device receives the signal from the body-side communication device with substantially the best reception. Moreover, it is also possible to determine the body-side transmission timing to be a timing at which the wheel-side communication device receives the signal from the body-side communication device when the actual rotational position of the wheel substantially matches the determined optimum receiving position.

As a result, this communication system can properly set the body-side transmission timing to be a timing at which the wheel-side communication device receives the signal from the body-side communication device under substantially the best conditions.

When it is necessary to start transmitting to the body-side communication device, the start transmission command is issued. Accordingly, the body-side transmission timing may also be the timing at which a command to start transmitting to the body-side communication device is issued (hereinafter this command is referred to as a "start transmission command").

The timing determining portion may also determine the body-side transmission timing based on at least one of i) the rotational speed of the wheel and ii) a transmission response time, which is the period of time from when the start transmission command is issued until the body-side communication device outputs the actual signal in response to that command.

The body-side communication device outputs a signal in response to the start transmission command being issued. Due to signal processing, there may be a delay before this signal is output after the start transmission command is issued, i.e., the signal may not be output immediately after the start transmission command is issued.

In this case, regardless of this response delay, if the start transmission command is issued at the exact time when the actual rotational position matches the optimum receiving position, the actual position of the wheel will no longer match the optimum receiving position by the time the signal that was actually output from the body-side communication device finally reaches the wheel-side communication device.

In this way, the actual rotational position of the wheel when the signal that was actually output from the body-side communication device reaches the wheel-side communication device (hereinafter referred to as "receiving time rotational position") is affected by the response delay of the body-side communication device.

Further, the amount that the receiving time rotational position is off with respect to the optimum receiving position depends on the rotation speed of the wheel.

Based on this knowledge, the body-side transmission timing, i.e., the timing at which the start transmission command is to be issued, may also be determined based on at least one of i) the rotational speed of the wheel and ii) the transmission response time, which is the period of time from when the start transmission command is issued until the body-side communication device outputs the actual signal in response to that command.

Therefore, it is possible to have the body-side communication device actually start transmitting at the proper time regardless of whether there is a response delay in the transmission.

Further, the communication system in the first aspect of the invention may also have a wheel-side transmission timing determining device which determines, based on the actual reception timing at which the wheel-side communication device actually received a signal that was transmitted by the body-side communication device at the body-side transmission timing, a wheel-side transmission timing at which the wheel-side communication device is to transmit a signal to the body-side communication device in response to that signal received from the body-side communication device.

In this aspect of the invention, the wheel-side transmission timing at which the wheel-side communication device is to send the signal to the body-side communication device is determined using the actual reception timing at which the signal transmitted by the body-side communication device at the body-side transmission timing was actually received by the wheel-side communication device.

Accordingly, the communication system makes it easy to determine the wheel-side transmission timing while taking into account its temporal relative relationship with the actual reception timing.

Moreover, the wheel-side transmission timing may be the timing at which the start transmission command to start transmitting to the wheel-side communication device is issued. Also, the wheel-side transmission timing determining device may include a timing determining portion which determines the wheel-side transmission timing based on i) a period of time during which the actual rotational position of the wheel last matched the optimum receiving position, ii) a period of time that it takes for the wheel to rotate once, and iii) a transmission response time, which is the period of time from when the start transmission command is issued until the wheel-side communication device actually starts to output the signal in response to the start transmission command.

By identifying the period of time during which the actual rotational position of the wheel last matched the optimum receiving position and the time that it takes for the wheel to rotate once, it is possible to calculate the period during which the actual rotational position of the wheel will next match the optimum transmitting position (referred to as the optimum transmitting position because, although this is the same phase as the optimum receiving position, the wheel-side communication device transmits, instead of receives, at this position).

Further, by identifying between this period and the transmission response time, which is the period of time from when the start transmission command is issued until the wheel-side communication device actually outputs the signal in response to the start transmission command, it is possible to calculate the wheel-side transmission timing, i.e., the timing at which the start transmission command should be issued.

Also in the first aspect of the invention, the wheel-side transmission timing determining device may be mounted to the vehicle body. Further, the wheel-side transmission timing determining device may include a secondary signal transmitting portion that appends a secondary signal indicative of the determined wheel-side transmission timing to a main signal to be transmitted from the body-side communication device at the body-side transmission timing and then transmits that secondary signal together with the main signal to the wheel-side communication device.

As a result, the wheel-side transmission timing need not be determined on the wheel side, which enables the signal processing load on the wheel side to be easily reduced.

Also in the first aspect of the invention, the rotational position detecting device may include i) a rotating body that rotates together with the wheel having a plurality of target detection positions lined up at equidistant intervals along the circumference of a circle, and ii) a detecting object that is provided at a fixed position on the vehicle body and individually detects the passing of the each one of the plurality of target detection positions.

This structure enables the rotational position of the tire/wheel assembly to be detected more precisely. Further, the detecting object may be a wheel speed sensor that detects an angular velocity of the wheel as the wheel speed.

According to this structure, it is possible to use the same wheel speed sensor to both detect the wheel speed and determine the transmission timing for at least one of the body-side communication device and the wheel-side communication device, thus making it is easy to reduce both the number of overall parts in the vehicle as well as equipment costs compared to when two separate sensors are used.

Further, the wheel-side communication device may transmit a tire state amount to the body-side communication device. The tire state amount may be, for example, the air pressure of the tire, force (such as longitudinal force, lateral force, vertical force) acting on the tire between the tire and the road surface, the deformation amount of the tire, the temperature of the tire, or the like.

Also in this aspect of the invention, the signal to be transmitted from the body-side communication device to the wheel-side communication device may include a request signal that requests that a signal indicative of information relating to the wheel be transmitted from the wheel-side communication device to the body-side communication device. The information relating to the wheel may be, for example, the air pressure of the tire, force (such as longitudinal force, lateral force, vertical force) acting on the tire between the tire and the road surface, the deformation amount of the tire, the temperature of the time, or the like.

Further, the signal to be transmitted from the body-side communication device to the wheel-side communication device may also include an electric energy signal which generates electric energy to be consumed by the wheel-side communication device.

This structure obviates the need to provide a power supply for operating the wheel-side communication device on the wheel side.

Also in this aspect of the invention, the rotational position detecting device may include an acceleration sensor which i) has directionality, ii) detects an acceleration, iii) is mounted to the wheel at a fixed position away from a rotational axis of the wheel, iv) which rotates together with the wheel around the rotational axis thereof. In addition, the electric energy signal is in itself (for example, its very physical existence, such as the actual electromagnetic waves) meaningful to the wheel-side communication device. In contrast, the request signal does not in itself mean anything to the wheel-side communication; rather, it is the information (content) indicated by that request signal that is meaningful to the wheel-side communication device.

The communication system of the first aspect of the invention may also be provided with a rotation state amount sensor mounted on the tire/wheel assembly and which detects the rotation state amount, and the wheel-side communication device may transmit the signal to the body-side communication device at a transmission timing in accordance with the rotational position of the tire/wheel assembly, based on the rotation state amount of the tire/wheel assembly. The rotation state amount is typically the rotational position, but this rotational position may also be either replaced by, or used together with, the rotational position, the rotational acceleration and the like.

The communication system in this aspect can inhibit deterioration of the communication state due to a change in the relative position between a wheel-side communication device that rotates together with a wheel, and a body-side communication device.

Further, in this aspect, a sensor which the wheel-side communication device use to determine an actual transmission timing may be mounted on the tire/wheel assembly side. This structure can enhance an independency of the wheel-side communication device, in the other hand, it decreases the dependency of the wheel-side communication on the vehicle body, compared with a structure in which at least one portion of the sensor is mounted on the vehicle body.

The communication system in this aspect may transmit a signal at a communication timing in accordance with the rotational position of the tire/wheel assembly, without waiting for a request signal from the body-side communication device. The communication system can transmit a signal at a communication timing in accordance with the rotational position, after the wheel-side communication device receive the request signal transmitted from the body-side communication device.

The direction of the acceleration acting on the acceleration sensor, which rotates together with the wheel around the rotational axis thereof changes in accordance with the rotation of the wheel. For example, when the acceleration acting on the acceleration sensor is gravitational acceleration, in a fixed global coordinate system in absolute space the direction in which gravitational acceleration acts does not change, regardless of rotation of the wheel. On the other hand, in a fixed local coordinate system in the sensor, the direction in which gravitational acceleration acts changes as the wheel rotates. In other words, a fixed relative relationship exists between the direction in which gravitation acceleration acts and the rotational position of the wheel.

For example, if the acceleration sensor is given directionality in the direction of the acceleration able to be detected by the sensor, when the acceleration acting on the acceleration sensor is gravitational acceleration, the acceleration detected by the sensor (i.e., the component acceleration) changes as the wheel rotates.

Therefore, the rotational position detecting device may include an acceleration sensor which i) has directionality, ii) detects acceleration, iii) is mounted to the wheel at a fixed position away from a rotational axis of the wheel, iv) rotates together with the wheel around the rotational axis thereof.

Further, the fixed position of the acceleration sensor may be a position from which the acceleration sensor detects the acceleration in a direction perpendicular to a direction in which centrifugal acceleration is generated in the acceleration sensor as the wheel rotates.

When the system is provided with the acceleration sensor, the acceleration sensor, which has directionality and is supposed to detect the gravitational acceleration acting upon it, ends up also detecting centrifugal acceleration generated as the wheel rotates, depending on the direction that the acceleration sensor is facing when it is mounted to the wheel.

Centrifugal acceleration acting on the acceleration sensor, however, always acts in the radially outward direction. By simply mounting the acceleration sensor, which is mounted in a fixed position to the wheel, in a position so that it is always perpendicular to the direction in which centrifugal acceleration acts, centrifugal acceleration is not detected by the acceleration sensor.

That is, the fixed position of the acceleration sensor may be a position from which the acceleration sensor detects the acceleration in a direction perpendicular to a direction in which centrifugal acceleration is generated in the acceleration sensor as the wheel rotates.

Accordingly, the acceleration sensor can select the kind of acceleration to be detected, such as detect gravitational acceleration but not detect centrifugal acceleration. In this case, the acceleration sensor detects the rotational position of the wheel based on a change in the direction in which the gravitational acceleration acts on the acceleration sensor, which occurs as the rotational position of the wheel changes.

The rotation state amount sensor is mounted in a fixed position on the wheel and detects the rotational position of the wheel by receiving electromagnetic waves emitted from the vehicle body side. With system, it is possible to detect the rotational position of the wheel using electromagnetic waves (e.g. direct light, reflected light, laser waves, ultrasonic waves, magnetic force, electromagnetic force) emitted from the vehicle body side.

Further, the timing according to the rotational position of the wheel can be set in advance based on the relationship between i) the relative positional relationship between the wheel-side communication device and the body-side communication device (associable with the rotational position of the wheel, for example) and ii) the quality of signal reception of a signal transmitted between the wheel-side communication device and the body-side communications device (associate with the receiving voltage of the body-side communication device, for example)

That is, the transmission timing of the wheel-side communication device according to the rotational position of the wheel may be set in advance based on the relationship between i) a relative positional relationship (in connection with the rotational position of the wheel, for example) between the wheel-side communication device and the body-side communication device, and ii) the quality of signal reception (in connection with the receiving voltage of the body-side communication device, for example) of a signal transmitted between the wheel-side communication device and the body-side communication device.

Accordingly, this system makes it possible to determine the transmission timing of the wheel-side communication device such that communication between the wheel-side communication device and the body-side communication device can be performed normally.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which:

FIGS. 7A and 7B is a flowchart schematically illustrating the content of a synchronized transmission program for the processing apparatus, which is stored in advance in the ROM shown in FIG. 6A;

FIG. 11 is a block diagram schematically showing the hardware configuration of a communication system for a vehicle according to a second exemplary embodiment of the invention;

DETAILED DESCRIPTION OF THE PREFERRED EMBODIMENTS

In the following description and the accompanying drawings, the present invention will be described in more detail in terms of exemplary embodiments.

Figure 1:
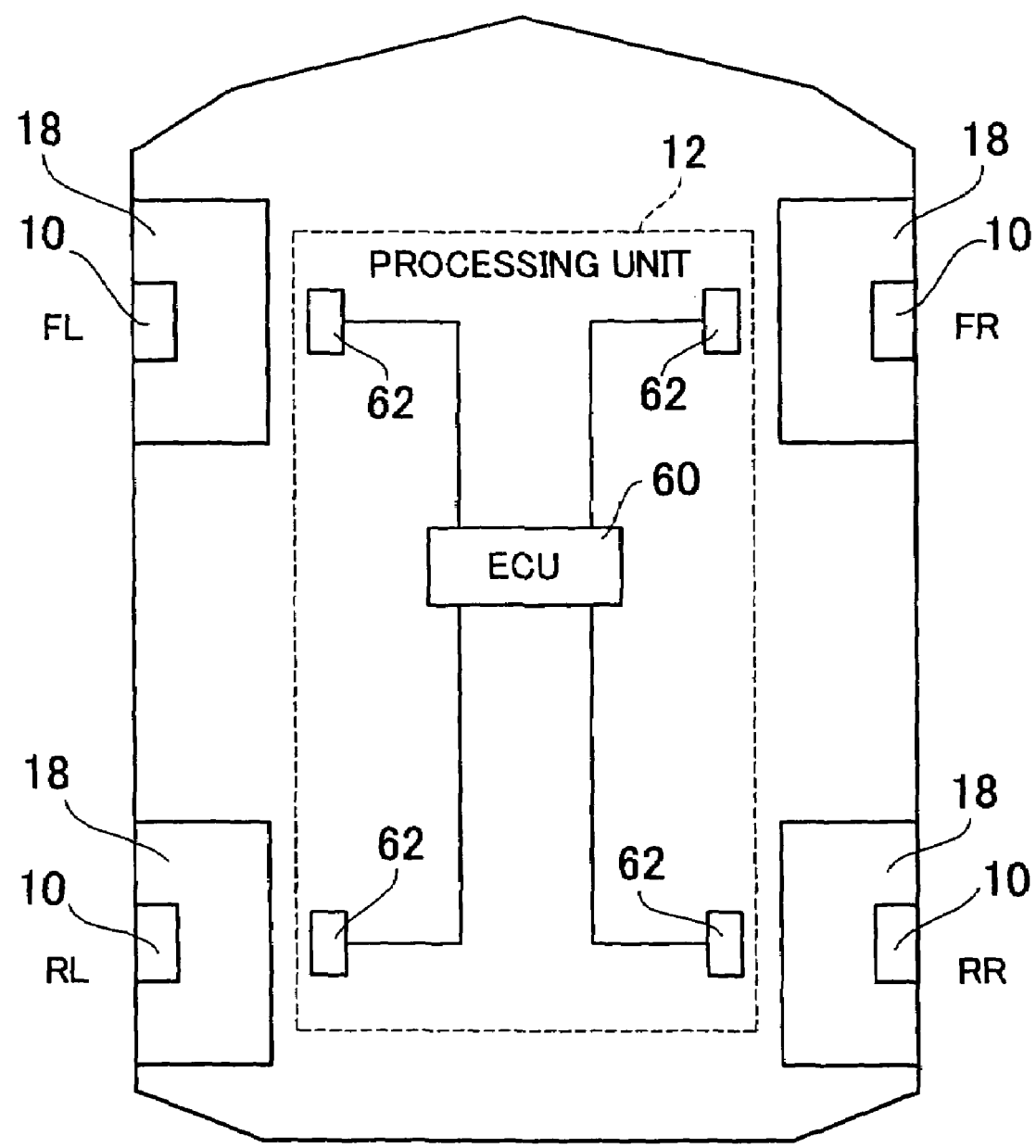
FIG. 1 is a plan view showing a communication system for communicating between a wheel and a vehicle body according to a first exemplary embodiment of the invention.

FIG. 1 is a plan view showing a communication system for communicating between a tire/wheel assembly (hereinafter also simply referred to as "wheel") and a vehicle body (hereinafter this communication system will simply be referred to as "system") according to one exemplary embodiment of the invention. This system is mounted in a vehicle. Left and right front wheels FL and FR and left and right rear wheels RL and RR of the vehicle are supported by the vehicle body. This system includes four detection units 10, one provided on each of four tire/wheel assemblies (hereinafter simply referred to as "wheels") 18, and a processing apparatus 12 mounted to the vehicle body.

The system is provided to remotely monitor a tire state quantity relating to each of the four wheels 18. The tire state quantities are monitored through wireless bilateral communication between the four detection units 10 and the processing apparatus 12.

Figure 2:
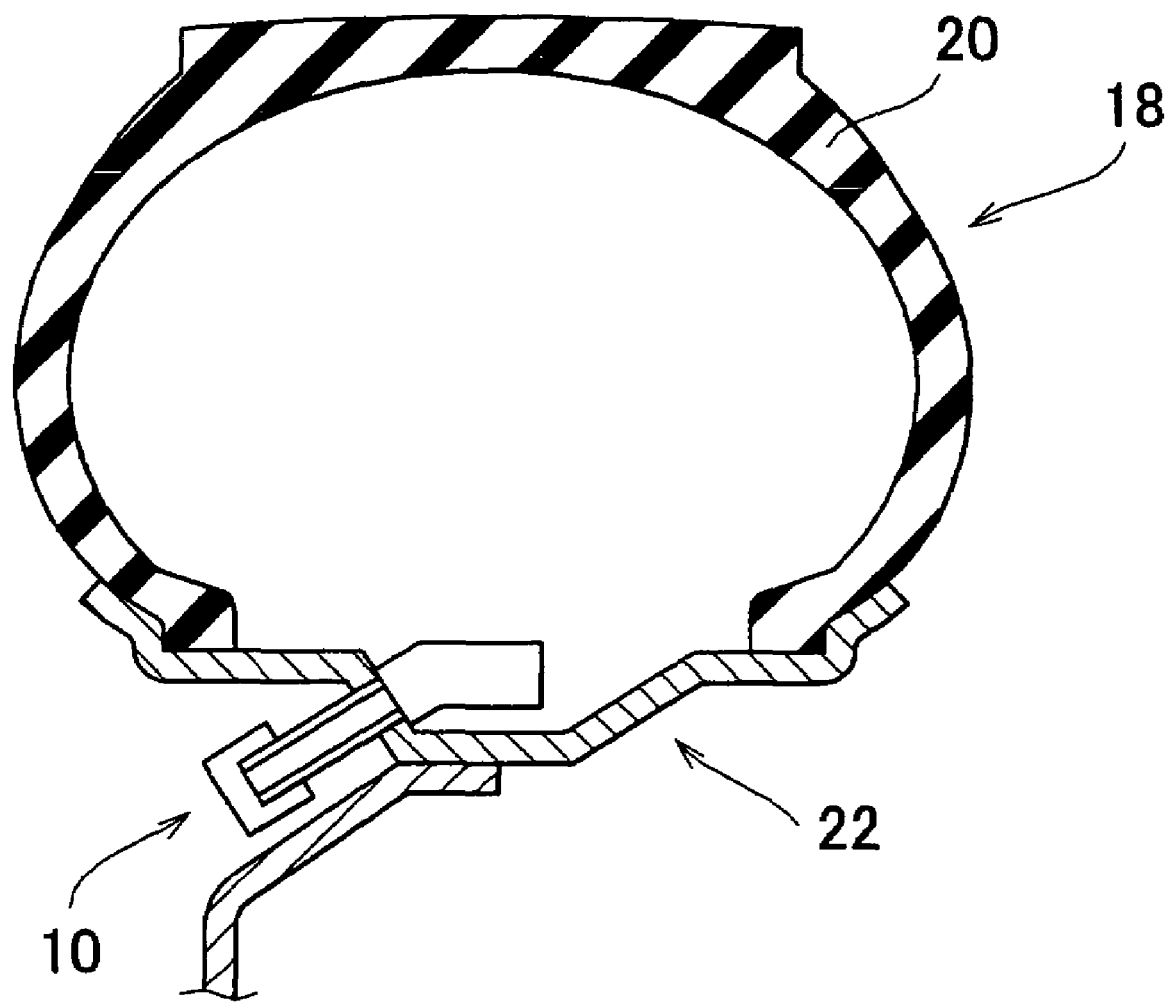
FIG. 2 is a sectional view showing a portion of one of the wheels in FIG. 1.

Referring to FIG. 2, each tire/wheel assembly 18 is made up of a tire 20 mounted on a wheel 22. The tire 20 is filled with air under pressure. In this exemplary embodiment, the detection unit 10 is mounted to the wheel 22. The detection unit 10 is structured such that a plurality of component parts, to be described later, are housed together in a common housing.

Figure 3:
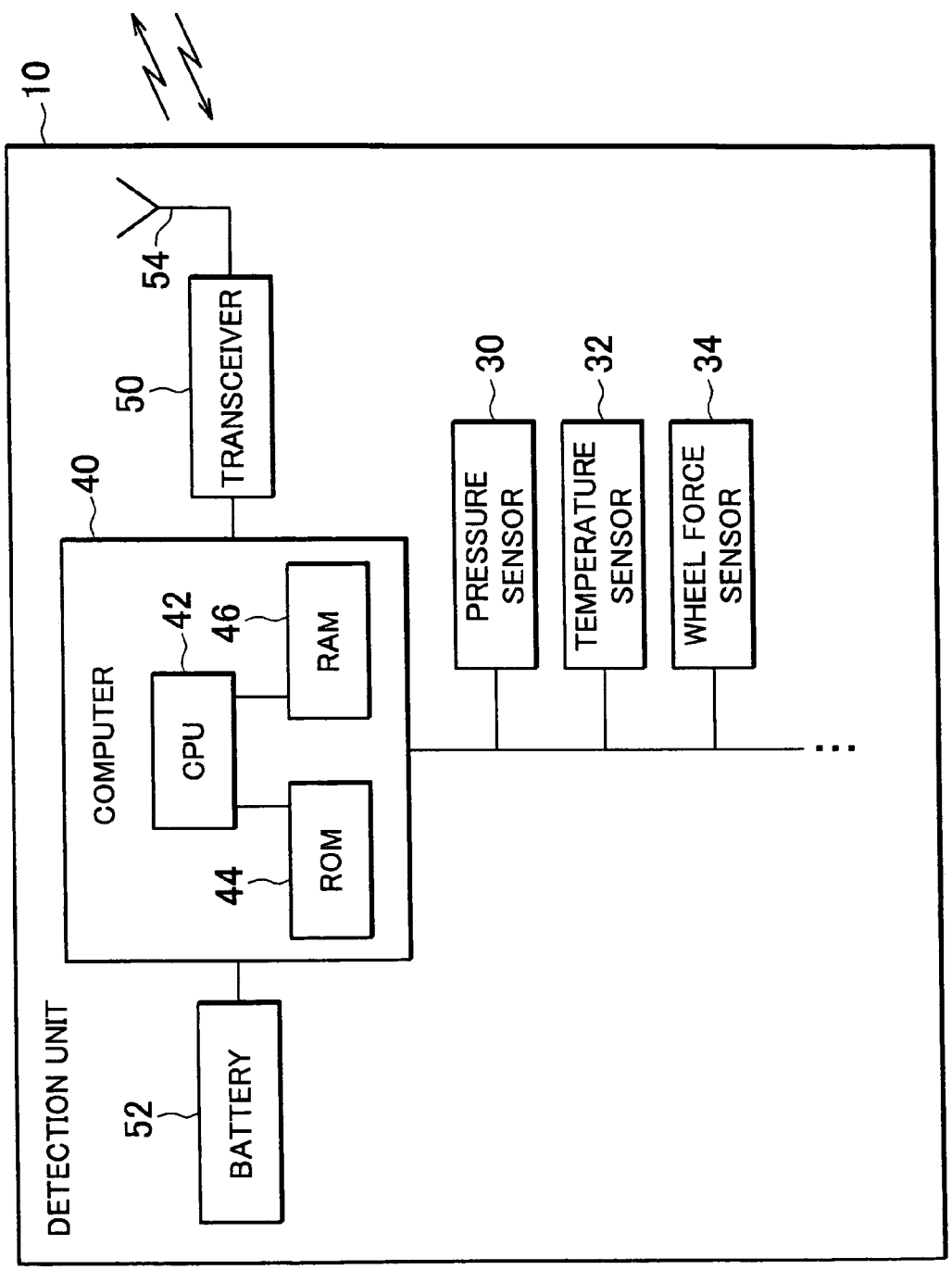
FIG. 3 is a block diagram illustrating the hardware configuration of a detection unit shown in FIG. 1.

FIG. 3 is a block diagram showing the hardware configuration of the detection unit 10. The detection unit 10 serves as a tire state quantity sensor and includes a pressure sensor 30 that directly detects an air pressure of the tire 20, a temperature sensor 32 that detects a temperature of the tire 20, and a wheel force sensor 34 that detects a force acting on the tire between the tire 20 and the road surface.

According to this exemplary embodiment, the detection unit 10 does not necessarily have to be provided with the wheel force sensor 34. Also, the detection unit 10 can also have a sensor that detects another physical quantity relating to the tire 20.

Referring to FIG. 3, the detection unit 10 further includes a computer 40. As is well known, the computer 40 includes a CPU 42, ROM 44, and RAM 46. The various sensors 30, 32, and 34 described above, as well as a transceiver 50 and a battery (one example of a power supply) 52 are connected to this computer 40. The transceiver 50 transmits and receives signals (radio waves) to and from the outside via an antenna 54. The battery 52 is a replaceable type which can not be recharged once drained.

Referring back to FIG. 1, the processing apparatus 12 is provided with an electronic control unit (hereinafter referred to as "ECU") 60 and four antennas 62, one provided in close proximity to the antenna 54 of the detection unit 10 of each wheel 18.

Figure 4:
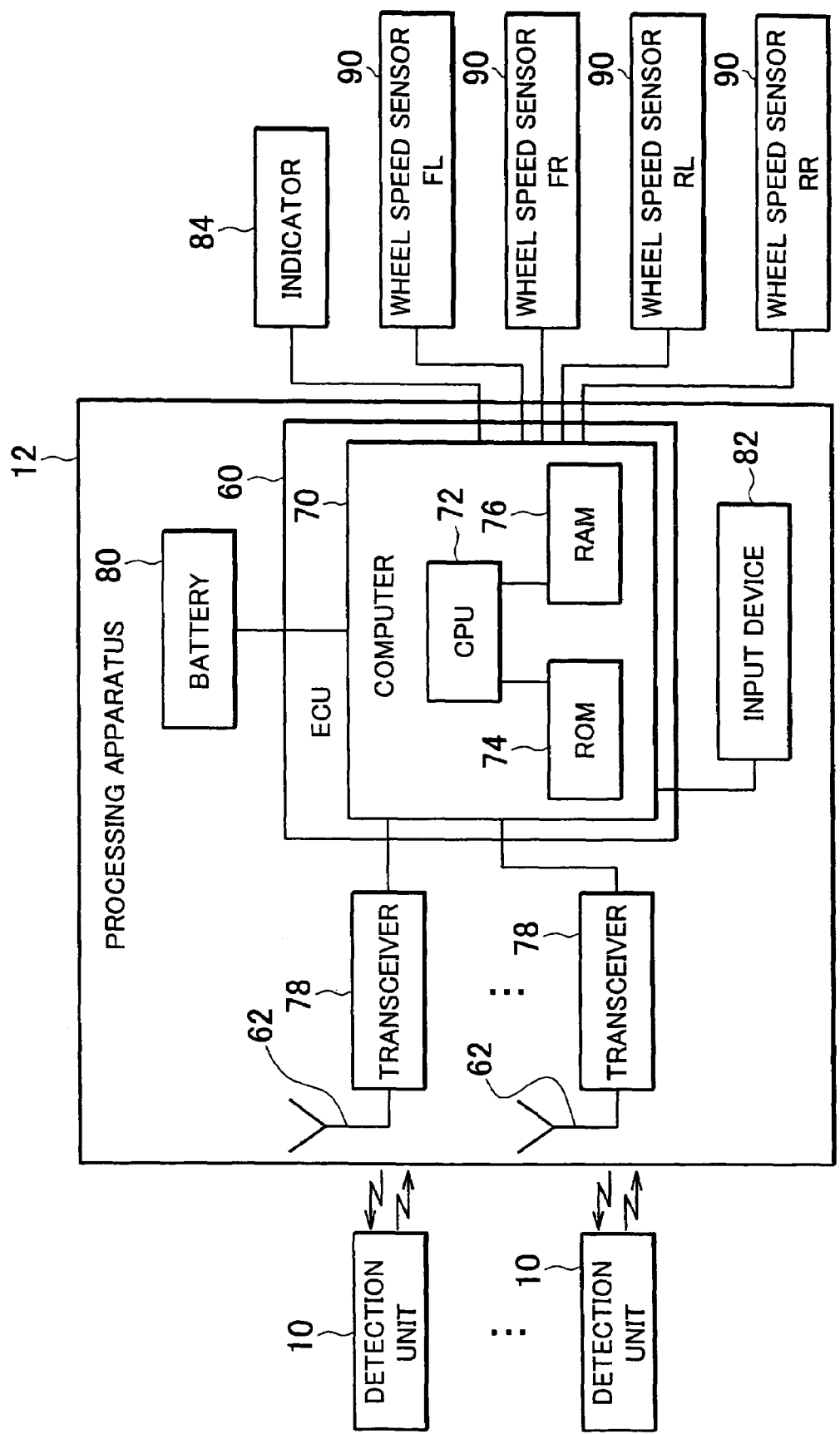
FIG. 4 is a block diagram illustrating the hardware configuration of a processing apparatus shown in FIG. 1.

As shown in FIG. 4, the ECU 60 includes a computer 70. Similar to the computer 40 for the detection unit 10, this computer 70 also includes a CPU 72, ROM 74, and RAM 76. The processing apparatus 12 also has four transceivers 78 connected to the ECU 60. Each of these four transceivers 78 is connected to a corresponding antenna 62. The ECU 60 is connected to a battery 80. As opposed to the battery 52 for the detection unit 10, this battery 80 is a rechargeable battery that can be recharged after it has been drained.

As shown in the drawing, an input device 82 and an indicator 84 are connected to the ECU 60. The input device 82 inputs and converts information indicative of operations by the driver of the vehicle into data form. The indicator 84 is one example of an output device and visually displays necessary information on a display. Another example of an output device is a buzzer which audibly outputs the information.

In this exemplary embodiment, the input device 82 and the indicator 84 are operatively inter-linked with one another. The driver is able to select and input information via the input device 82 with respect to the information displayed by the indicator 84.

Figure 5:
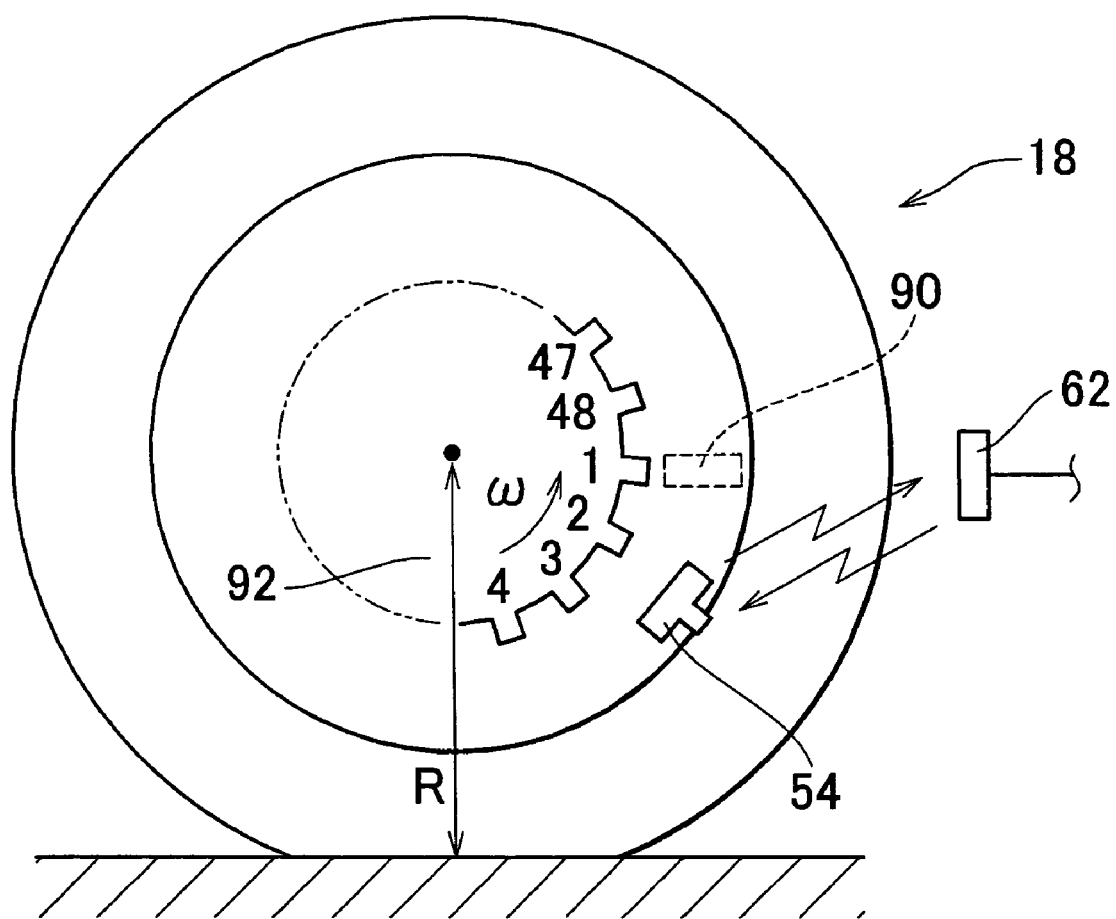
FIG. 5 is a front view illustrating the relative positional relationship between an antenna shown in FIG. 3 and an antenna and wheel speed sensor shown in FIG. 4.

As shown in FIG. 4, four wheel speed sensors 90, one of each of which is provided for each of the wheels 18, are also connected to the ECU 60. Each wheel speed sensor 90 is mounted to the vehicle body in a fixed position close to a rotor 92 that rotates together with the wheel 18, as shown in FIG. 5. This rotor 92 has a plurality of teeth (48 in the example shown in FIG. 5) on its outer periphery. These plurality of teeth are formed in a complete circle that has the same axis as the wheel 18. The wheel speed sensor 90 is an electromagnetic pickup that electromagnetically detects each tooth of the rotor 92 as it passes by. The wheel speed sensor 90 generates a voltage signal in the form of a pulse that rises each time a tooth of the rotor 92 passes by.

In this way, the wheel speed sensors 90 are all activated in connection with the rotor 92. The wheel speed sensors 90 are used both to detect the angular velocity of the wheels 18 as the wheel speed, as well as to determine the transmission timing of the detection units 10 and the transmission timing of the processing apparatus 12.

FIG. 6 schematically shows both the construction of the ROM 74 and RAM 76 of the ECU 60 and the construction of the ROM 44 and RAM 46 of the detection unit 10.

Figure 6A:
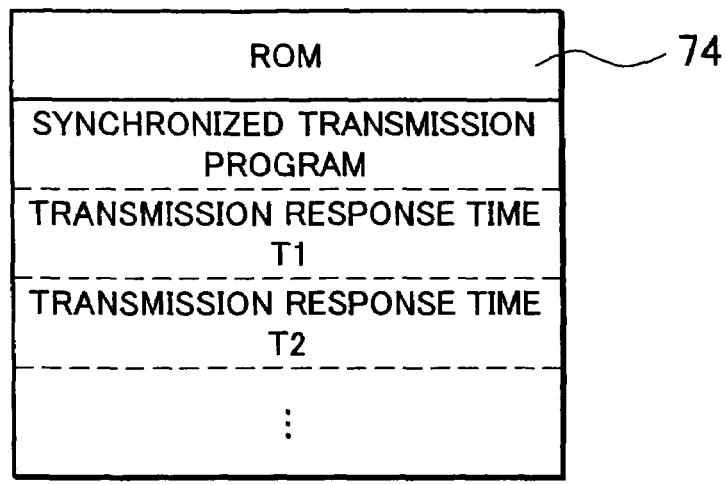
FIG. 6A is a block diagram schematically illustrating the construction of ROM and RAM in the processing apparatus shown in FIG. 4.
Figure 7A:
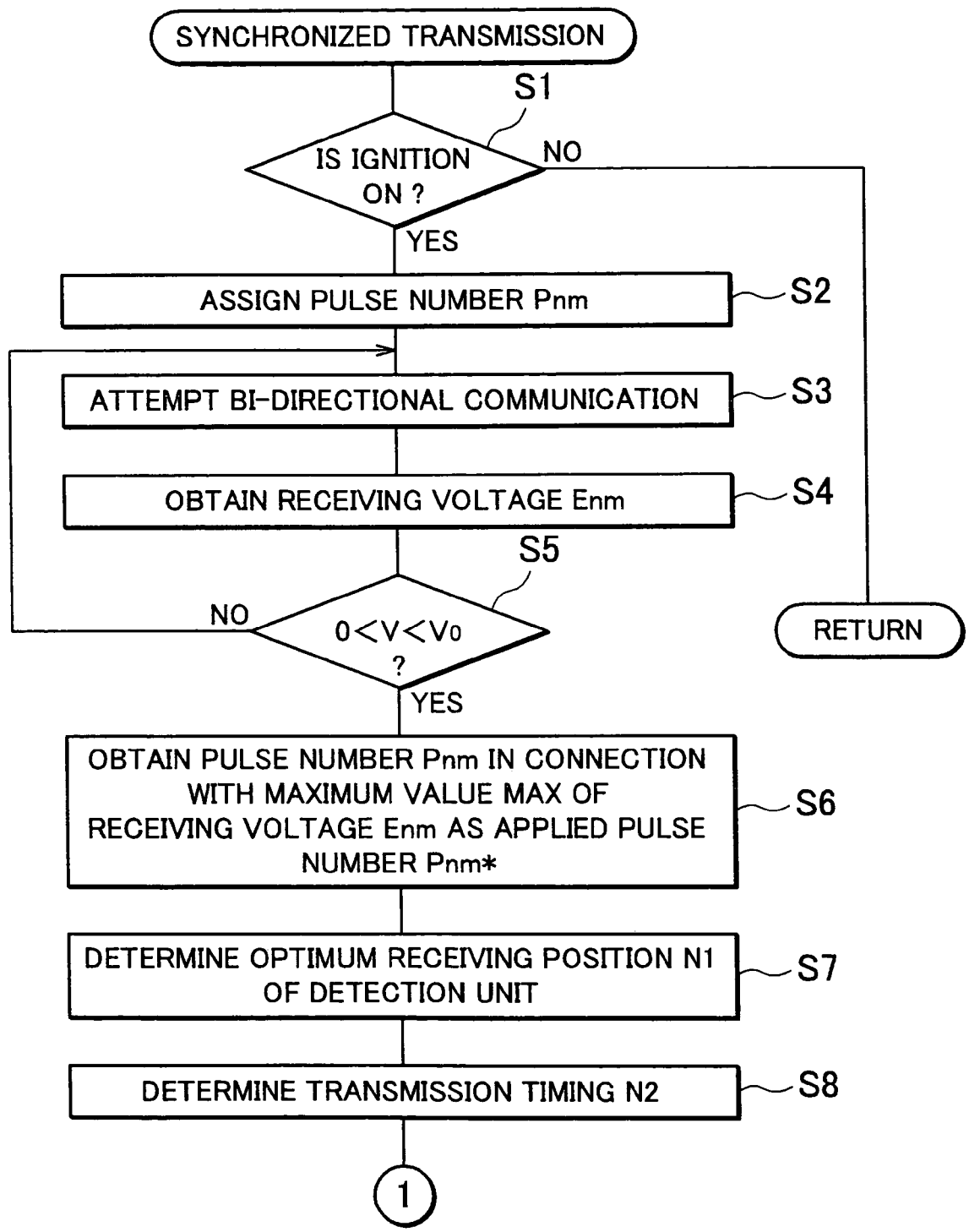

As shown in FIG. 6A, a synchronized transmission program schematically shown in the flowchart in FIG. 7A, 7B is stored in advance in the ROM 74 of the ECU 60. Data indicative of the lengths of a transmission time T1 and a transmission time T2 is also stored beforehand in the ROM 74. The transmission time T1 indicates the time from when the ECU 60 issues the start transmission command until the time when the signal is actually output from the antenna 62 via the transceiver 78. Similarly, the transmission time T2 indicates the time from when the computer 40 of the detection unit 10 issues the start transmission command until the time when the signal is actually output from the antenna 54 via the transceiver 50.

Figure 8:
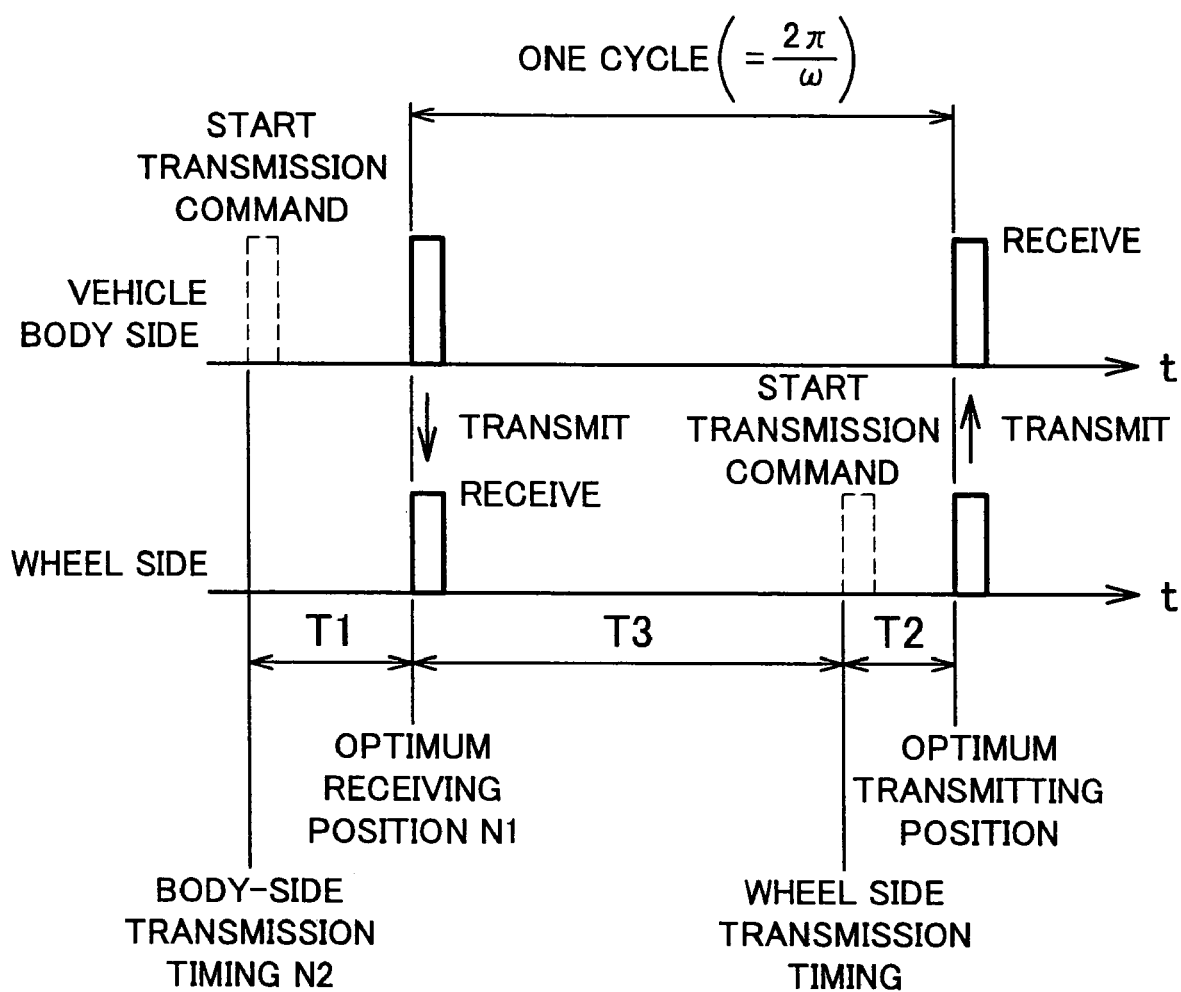
FIG. 8 is a time chart schematically illustrating one example of bilateral communication between the detection unit shown in FIG. 3 and the processing apparatus shown in FIG. 4.

FIG. 8 is a time chart illustrating one example of bi-directional communication between the processing apparatus 12 and the detection unit 10. In this example, the signal is actually output from the processing apparatus 12 after the transmission time T1 has passed from the time the ECU 60 issued the start transmission command. This signal is received by the detection unit 10 immediately after being sent. The computer 40 of the detection unit 10 issues the start transmission command after a time interval T3 has passed from the time the signal was received. A signal is actually output from the detection unit 10 after the transmission time T2 has passed from the time the computer 40 of the detection unit 10 issued the start transmission command. This signal is received by the processing apparatus 12 immediately after being sent.

As shown in FIG. 6A, the location where the data indicative of the length of the time interval T3 is temporarily stored, in addition to the location where the data indicative of a wheel speed ω is temporarily stored, are both set in the RAM 76 of the ECU 60. The time interval T3 is used to define the transmission timing of the detection unit 10. The wheel speed ω is used to calculate the transmission timing of the processing apparatus 12.

The time interval T3 is calculated for each wheel 18 by executing the synchronized transmission program shown in FIG. 7A, 7B. A signal indicative of the time interval T3 is forwarded from the processing apparatus 12 to the detection unit 10 for each wheel 18. The wheel speed ω is calculated for each wheel 18 using the corresponding wheel speed sensor 90.

Figure 6B:
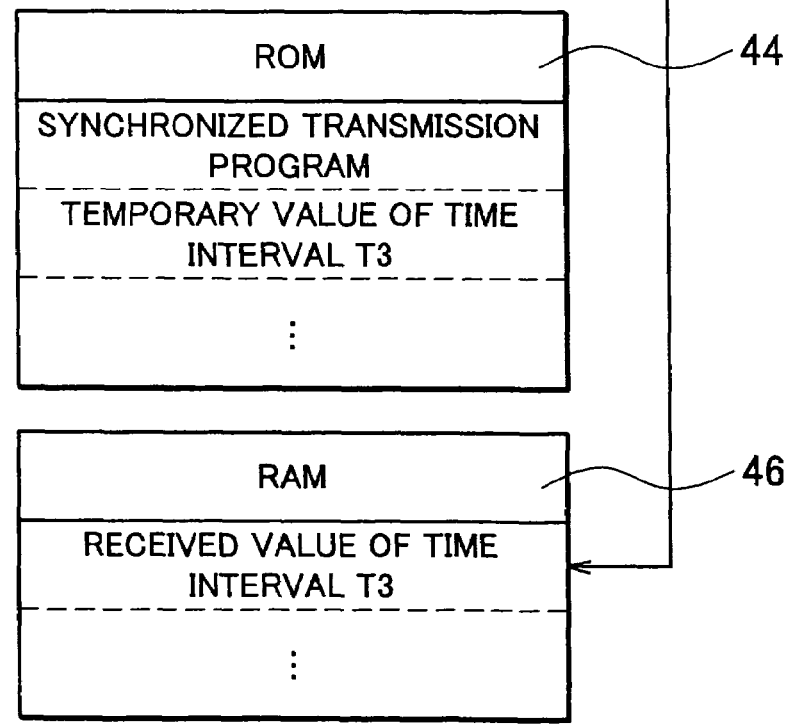
FIG. 6B is a block diagram schematically illustrating the construction of ROM and RAM in the detection unit shown in FIG. 3.
Figure 9:
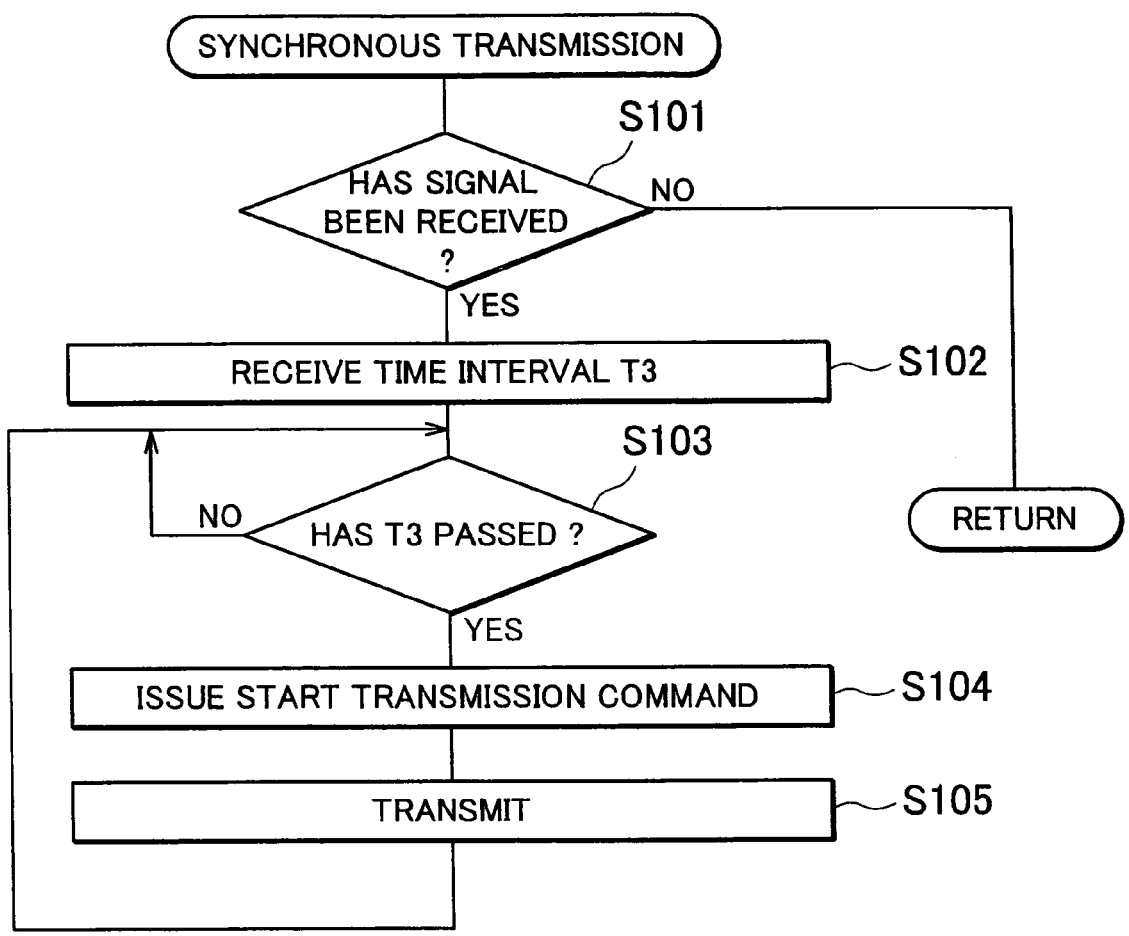
FIG. 9 is a flowchart schematically illustrating the content of a synchronized transmission program for the detection unit, which is stored in advance in the ROM shown in FIG. 6B.

In contrast, as shown in FIG. 6B, a synchronized transmission program schematically shown in the flowchart in FIG. 9 is stored in advance in the ROM 44 of the detection unit 10. Data indicative of a temporary value of the time interval T3 is also stored beforehand in the ROM 44.

Also, the location where the data indicative of the length of the time interval T3, which is indicated by the signal received from the processing apparatus 12, for each wheel 18 is temporarily stored is set in the RAM 46 of the detection unit 10.

FIG. 7A, 7B is a flowchart schematically illustrating the synchronized transmission program executed by the processing apparatus 12 on the vehicle body side. The synchronized transmission program shown in the drawing is repeatedly executed by the computer 70 of the ECU 60. Each time the program is executed, it is first determined in step S1 whether an ignition switch (not shown), which serves as a switch used to operate the vehicle, has just been turned from off to on by a user (such as the driver) of the vehicle. If it is determined that the ignition switch has not just been turned on, the determination is no and this cycle of the synchronized transmission program immediately ends.

If it is determined that the ignition switch has just been turned on, however, the determination in step S1 is yes and step S2 is executed. In step S2, a number that increases in increments of one is assigned to each pulse as a pulse number Pnm every time the wheel speed sensor 90 generates one pulse (i.e., every time the wheel speed sensor 90 detects a tooth of the rotor 92). These pulse numbers Pnm are assigned during one rotation of the wheel immediately after the ignition switch has been turned on. That is, a unique pulse number is assigned to each tooth of the rotator for one rotation of the wheel.

The pulse number Pnm indicates the position of each tooth of the rotor 92 and the rotational position of the wheel 18. In this exemplary embodiment, reference character "n" in the pulse number Pnm is indicated by a number between 1 and 48. Reference character "m" in the pulse number Pnm indicates the location of the wheel 18, i.e., it indicates a specific wheel 18 from among the four wheels 18. For example, when "m" is 1 it indicates the front left wheel FL; when "m" is 2 it indicates the right front wheel FR; when "m" is 3 it indicates the left rear wheel RL; when "m" is 4 it indicates the right rear wheel RR.

After the second rotation of the wheel 18 immediately after the ignition switch was turned on, bi-directional communication between the processing apparatus 12 and the detection unit 10 is attempted for each wheel 18 in step S3. In this exemplary embodiment, the detection unit 10 receives the signal transmitted by the processing apparatus 12. The detection unit 10 is designed to wait for the temporary value of the time interval T3 to pass after the signal is received, and then output some sort of signal (such as a signal indicative of a tire pressure P).

In step S4, a receiving voltage (one example of this is the "received signal level") Enm is obtained, which is the voltage of the signal received by the processing apparatus 12 from the detection unit 10. Reference characters "n" and "m" in the receiving voltage Enm correspond to the "n" and "m", respectively, of the pulse number Pnm. This receiving voltage Enm indicates the height of the voltage of the signal received by the processing apparatus 12 at the rotational position of the wheel corresponding to the pulse number Pnm.

In step S5, a vehicle speed V is detected and it is determined whether that vehicle speed V is greater than 0 but less than a reference value V0 (such as 20 km/h). If this condition is satisfied, steps S3 and S4 are repeatedly executed until the condition is no longer satisfied, at which time the routine proceeds on to step S6. If the condition is not satisfied, the routine proceeds on to step S6. In step 5, as alternative embodiments, it may be determined whether the vehicle speed V is maintained constant, or it may be determined whether both of the condition in which the vehicle speed V is less than the reference V0 and the condition in which the vehicle speed V is maintained constant.

Steps S3 and S4 must be executed when the vehicle is running and the wheels 18 are rotating. For a signal to be sent and received once by the same apparatus on one side (hereinafter referred to as "one roundtrip transmission") (i.e., for one signal to be sent by an apparatus and then a response signal to be received by that apparatus), it takes the sum of 1) the amount of time necessary for the processing apparatus 12 to transmit a signal and the detection unit 10 to receive that signal, and 2) the amount of time necessary for the detection unit 10 to transmit a signal in response to the signal output by the processing apparatus 12 and the processing apparatus 12 to receive that signal.

In the exemplary embodiment, the rotational position of the wheel preferably does not change by more than an angle equivalent to one tooth of the rotor 92 before the processing apparatus 12 obtains the receiving voltage Enm with one roundtrip transmission. By having the rotational position of the wheel not change by more than an angle equivalent to one tooth of the rotor 92, it possible to accurately grasp the relationship between the receiving voltage Enm and the rotational position of the wheel (i.e., it is possible to accurately grasp the relative position between the antenna 62 of the processing apparatus 12 and the antenna 54 of the detection unit 10). It is preferable that the length of time necessary for one roundtrip transmission be negligible with respect to the length of time it takes for the rotational position of the wheel to change an amount equal to that of one tooth of the rotor 92. Accordingly, it is possible to grasp the receiving voltage Enm for each tooth of the rotor (i.e., for each rotational position of the wheel) by the first several rotations, during which the rotation speed of the wheel is relatively slow.

Accordingly in this exemplary embodiment, if the vehicle speed V is greater than 0 but less than the reference value V0, the determination in step S5 is yes, and steps S3 and S4 are repeatedly executed until the determination in step S5 is no.

Figure 10:
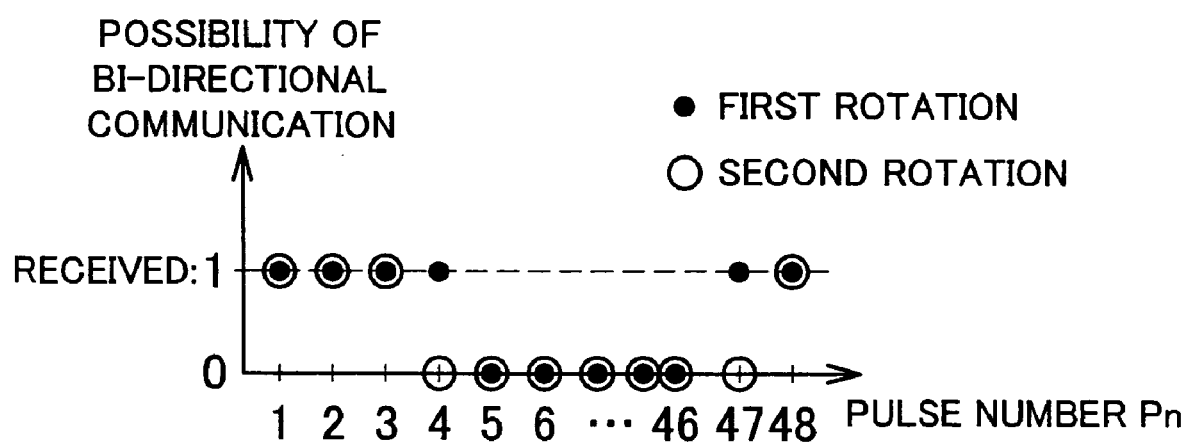
FIG. 10 is a graph illustrating execution of the synchronized transmission program shown in FIGS. 7A and 7B.

FIG. 10 is a graph schematically illustrating one example in which a receiving voltage En was obtained in connection with a pulse number Pn while any of the four wheels 18 rotates twice. The values 0 and 1 along the vertical axis of the graph indicate whether or not the receiving voltage En is high enough to enable bi-directional communication between the processing apparatus 12 and the detection unit 10. When the index along the vertical axis is 0, it means that the receiving voltage En is too low to enable bi-directional communication. When the index is 1, it means that the receiving voltage En is high enough to enable bi-directional communication.

If the determination in step S5 is no, then in step S6 a maximum value MAX from among the plurality of receiving voltages Enm obtained in connection with all of the pulse numbers Pnm is obtained for each wheel 18. In the example shown in FIG. 10, for example, because there is a plurality of receiving voltages En indicated by the value 1, the receiving voltage En that is in the middle of these plurality of receiving voltages En is selected as the maximum value MAX for the pulse number Pn. With the example shown in FIG. 10, the maximum value MAX for the receiving voltage En would then be the receiving voltage En when the pulse number Pn is "1" or "2".

In step S6 the pulse number Pnm in connection with the maximum value MAX obtained in this way is then obtained as an applied pulse number Pnm*.

Then in step S7, the applied pulse number Pnm* is determined from among the plurality of rotational positions of the wheel 18 as an optimum receiving position N1 which is optimal for the detection unit 10 to transmit and receive signals to and from the processing unit 12.

Next in step S8, a transmission timing N2 of the processing apparatus 12 is determined for each wheel 18 so that the signal from the processing apparatus 12 reaches the detection unit 10 when the actual rotational position of the wheel 18 substantially matches the optimum receiving position N1. This transmission timing N2 corresponds to the timing at which the start transmission command is issued by the processing apparatus 12. In this exemplary embodiment, the transmission timing N2 is expressed by the rotational position of the wheel 18.

In this exemplary embodiment, the transmission timing N2 can be determined using the following expression, for example.

$$N2 = N1 - 48 \times T1 \times R\omega/(2\pi R)$$
$$= N1 - 24 \times T1 \times \omega/\pi$$

The second term to the right in the expression indicates a value in which a transmission response time T1 has been converted into the number of teeth on the rotor 92 based on the wheel speed ω. The term "R" in the expression stands for the energy load radius of the tire.

Then in step S9, the length of the time interval T3 is determined. The length of the time interval T3 is calculated by subtracting the transmission response time T2 from the length of one cycle of wheel rotation as shown in FIG. 8, as in the following expression for example.

$$T3 = 2\pi R/R\omega - T2$$
$$= 2\pi/\omega - T2$$

The data indicating the length of the time interval T3 determined in this manner is stored in the RAM 76.

Then in step S10 in FIG. 7A, the processing apparatus 12 waits until the actual rotation N of the wheel 18 substantially matches the transmission timing N2 for each wheel 18. When the actual rotation N of the wheel 18 matches the transmission timing N2, the determination in step S10 is yes and the routine proceeds on to step S11.

In step S11, the start transmission command is issued at a communication timing N3 of the detection unit 10. Then in step S12 a main signal is output from the processing apparatus 12 to the detection unit 10 for each wheel 18. This main signal is a request signal that indicates a request that the detection unit 10 transmit a detection value for the tire state quantity. This transmission of these main signals for the plurality of wheels 18 of the vehicle do not have to be done all at the same time. On the contrary, they are normally performed at different timings because the transmission timings N1 and N2 between the plurality of wheels 18 do not usually match.

Next in step S13, data indicative of the time interval T3 for each wheel is read from the RAM 76, and a secondary signal indicative of the read data is appended to the main signal and sent, together with the main signal, to the detection unit 10 from the processing apparatus 12.

Steps S10 through S13 are then repeatedly executed, such that each transmission from the processing apparatus 12 becomes synchronized with the optimum receiving position (see FIG. 8) from among the plurality of rotational positions of the wheel 18.

The synchronized transmission program shown in FIG. 9 is repeatedly executed for each wheel 18 by the computer 40 of the detection unit 10. Each time the program is executed, it is first determined in step S101 whether the main signal from the processing apparatus 12 has just been received by the detection unit 10. If the main signal has not just been received, the determination is no and this cycle of the synchronized transmission program immediately ends.

If, on the other hand, the main signal has just been received, the determination in step S101 is yes and the routine proceeds on to step S102. In step S102 a secondary signal, i.e., a signal indicative of the length of the time interval T3, sent from the processing apparatus 12 is received by the detection unit 10. The detection unit 10 then waits for a period of the time equivalent to the length of the time interval T3 to pass.

When the time equivalent to the length of the time interval T3 has passed, the determination in step S103 becomes yes and the routine proceeds on to step S104, where the start transmission command is issued. Then in step S105, a signal indicative of the detection value of the tire state quantity relating to the corresponding wheel 18 is output from the detection unit 10 to the processing apparatus 12.

Steps S103 through S105 are then repeatedly executed, such that each transmission from the detection unit 10 becomes synchronized with the optimum receiving position (see FIG. 8) from among the plurality of rotational positions of the wheel 18.

In other words, according to the exemplary embodiment, bi-directional communication between the processing apparatus 12 and the detection unit 10 is performed using a LF frequency band (such as a low frequency range). Using a LF frequency band for bi-directional communication is generally less expensive than using a RF frequency band (such as a high frequency range) because an inexpensive communication cable can be used, thus reducing equipment costs. On the other hand, however, there is a possibility of reduced reception if the LF frequency band is used because, due to communication regulations, strong radio waves can not be used in the LF frequency band while strong radio waves can be used in the RF frequency band.

According to this exemplary embodiment, however, even if the LF frequency band is used, a decrease in reception is inhibited because the transmission timing is optimized. As a result, it is easy to inhibit a decrease in reception while enabling costs to be reduced.

As described above, in this exemplary embodiment, the processing apparatus 12 constitutes one example of the body-side communication device and each detection unit 10 constitutes one example of the wheel-side communication device.

Also in this exemplary embodiment, the portions, from among each of the wheel speed sensors 90, rotors 92, and the computer 70, that execute steps S1 and S2 in FIG. 7A work together and constitute one example of the rotational position detecting device. The portion of the computer 70 that executes steps S3 through S8 in FIG. 7A, 7B constitutes one example of the body-side transmission timing determining device.

Further, in the exemplary embodiment, the portion of the computer 70 that executes step S4 in FIG. 7A constitutes one example of the level obtaining portion.

Also in the exemplary embodiment, the portion of the computer 70 that executes steps S3 through S7 in FIG. 7A, 7B constitutes one example of the position determining portion. Also, the portion of the computer 70 that executes step S8 in FIG. 7A constitutes one example of the timing determining potion.

Also in the exemplary embodiment, the portion of the computer 70 that executes steps S9 through S13 in FIG. 7B constitutes one example of the wheel-side transmission timing determining portion.

Also in the exemplary embodiment, the portion of the computer 70 that executes step S9 in FIG. 7B constitutes one example of the timing determining portion.

Also in the exemplary embodiment, the portion of the computer 70 that executes step S11 in FIG. 7B constitutes one example of the secondary signal transmitting portion.

Also in the exemplary embodiment, each wheel speed sensor 90 constitutes one example of the detecting object. Further, the rotor 92 constitutes one example of the rotating body.

In the exemplary embodiment, the signal transmitted from the vehicle body side to the wheel side is designed to be a request signal for requesting that a signal indicative of information relating to the wheel 18 be sent from the wheel side to the vehicle body side. The signal may also be designed to include an electric energy signal which generates electric energy to be consumed by the detection unit 10, for example. Doing so obviates the need to provide a power supply for the detection unit 10 on the wheel side.

In the exemplary embodiment, the transmission timing N2 and the time interval T3 (which corresponds to the transmission timing of the detection unit 10) are calculated, irrespective of the vehicle speed V, taking the transmission response times T1 and T2 into account. The affects from the transmission response times T1 and T2 are negligible in the region where the vehicle speed V is low and large in the region where the vehicle speed V is high.

Therefore, when the vehicle speed V is equal to, or less than, a threshold value, the transmission timing N2 and the time interval T3 may be determined without taking the transmission response times T1 and T2 into account, and when the vehicle speed V is greater than the threshold value, the transmission timing N2 and the time interval T3 may be determined taking the transmission response times T1 and T2 into account. Thus, this exemplary embodiment facilitates faster calculations of the transmission timing N2 and the time interval T3.

In the following description and the accompanying drawings, the present invention will be described in more detail in terms of a second exemplary embodiment.

FIG. 11 is a block diagram schematically showing the hardware configuration of a communication system for a vehicle according to the second exemplary embodiment of the invention. This system is provided with a plurality of detection units 110 on the wheel side and a processing apparatus 112 on the body side of the vehicle. One detection unit 110 is provided for each wheel of the vehicle, while the same processing apparatus 112 is shared among all of the wheels.

Just as in the first exemplary embodiment, each tire/wheel assembly 18 has a tire 20, which is filled with air under pressure, mounted on a wheel 22. In this exemplary embodiment, the detection unit 110 is mounted on the wheel 22. The detection unit 110 includes a pressure sensor 130 that directly detects the air pressure of the tire 20, a position sensor 200, a data processing portion 124, and a transmitter 150.

Figures 12A, 12B:
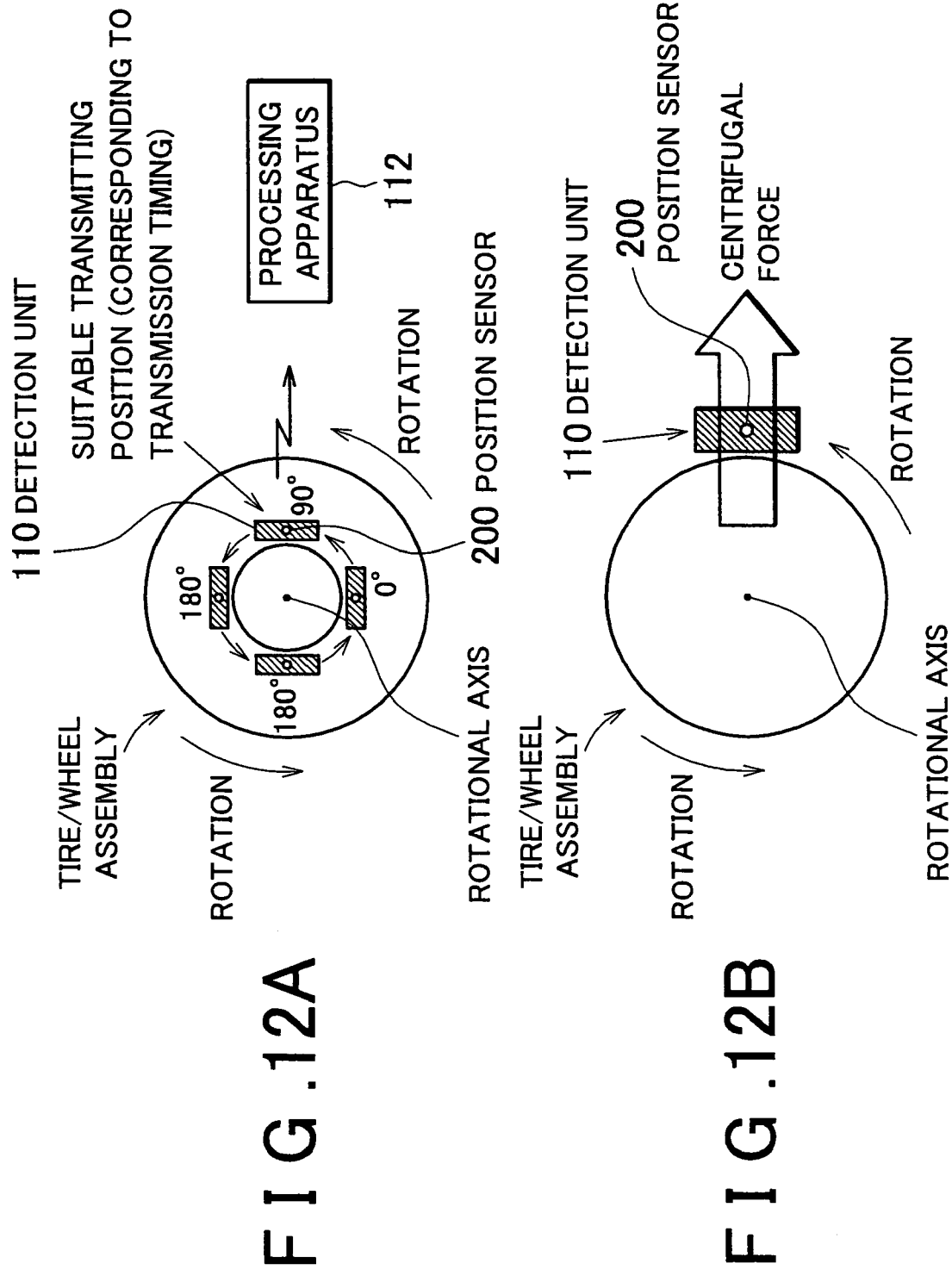
FIGS. 12A and 12B are front views illustrating the detection principle of the rotational position of the wheel by a position sensor shown in FIG. 11 in relation to the wheel.

As shown in FIG. 12A, the detection unit 110 is mounted to the wheel 22 at a fixed position away from the rotational axis of the wheel 22, and rotates around the rotational axis together with the wheel 22. Because the position sensor 200 is housed in the detection unit 110, it also rotates around the rotational axis together with the wheel 22. FIG. 12A shows a representational view of the detection unit 110, including the position sensor 200, in four representative rotational positions, i.e., at rotational positions in which the rotation angle of the tire is 0 degrees, 90 degrees, 180 degrees, and 270 degrees.

In a fixed global coordinate system in absolute space, the direction in which gravitational acceleration acts on the position sensor 200 does not change, regardless of the rotation of the wheel. On the other hand, in a fixed local coordinate system in the position sensor 200, the direction in which that gravitational acceleration acts changes as the wheel rotates. A fixed relative relationship exists between the direction in which gravitation acceleration acts and the rotational position of the wheel.

Accordingly, if the position sensor 200 is directed so as to detect acceleration, then the acceleration (component acceleration) detected by the position sensor 200 will change as the wheel rotates.

Therefore, a directional acceleration sensor is used for the position sensor 200. This position sensor 200 detects the rotational position of the wheel using the fact that the direction of gravitational acceleration acting on the position sensor 200 itself changes in response to the rotational position of the wheel.

Depending on the direction in which the positional sensor 200 is detecting the acceleration, the position sensor 200 may detect centrifugal acceleration which it is not meant to detect. The position sensor 200 is therefore positioned on the wheel so as to detect acceleration in a direction perpendicular to the direction in which centrifugal acceleration is generated in the position sensor 200 as the wheel rotates.

More specifically, as shown in FIG. 12B, the position sensor 200 is mounted to the wheel so as to detect acceleration in a direction tangent to the mounting point of the position sensor 200 on the wheel (i.e., in the direction of a tangential line that passes through the mounting point of the position sensor 200 on a circle having the same axis as the wheel).

Figure 13:
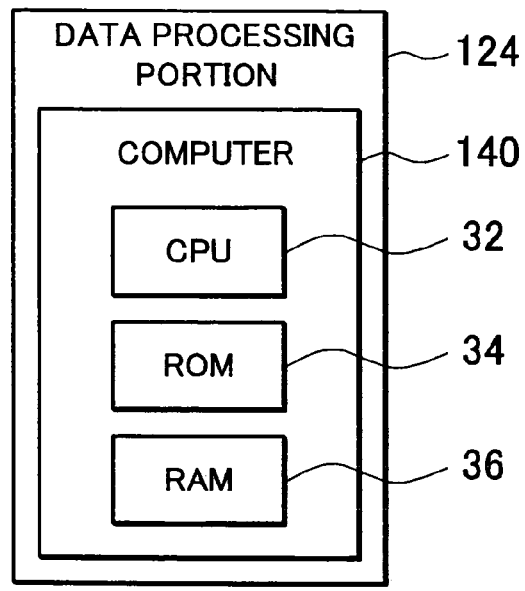
FIG. 13 is a block view schematically showing the hardware configuration of a data processing portion in FIG. 11.

Referring back to FIG. 11, the data processing portion 124 (or the signal processing portion) is connected to the pressure sensor 130 and the position sensor 200. The data processing portion 124 has a computer 140 as its main component, as shown in FIG. 13. Just as in the first exemplary embodiment, this computer 140 includes a CPU 142, ROM 144, and RAM 146. A transmission control program, to be described later, as well as various other programs are stored in advance in the ROM 144 of the data processing portion 124 of the detection unit.

As shown in FIG. 11, the transmitter 150 is connected to the data processing portion 124 and sends a signal indicative of an air pressure of a tire detected by the pressure sensor 130 to the processing apparatus 112 at an appropriate timing in response to a command from the data processing portion 124.

As shown in FIG. 11, the processing apparatus 112 includes a receiver 178 which receives signals from the detection unit 110, and a data processing portion 160 that is connected to that receiver 178. The data processing portion 160 obtains the tire air pressure for each wheel based on signals from the receiver 178.

Figure 14:
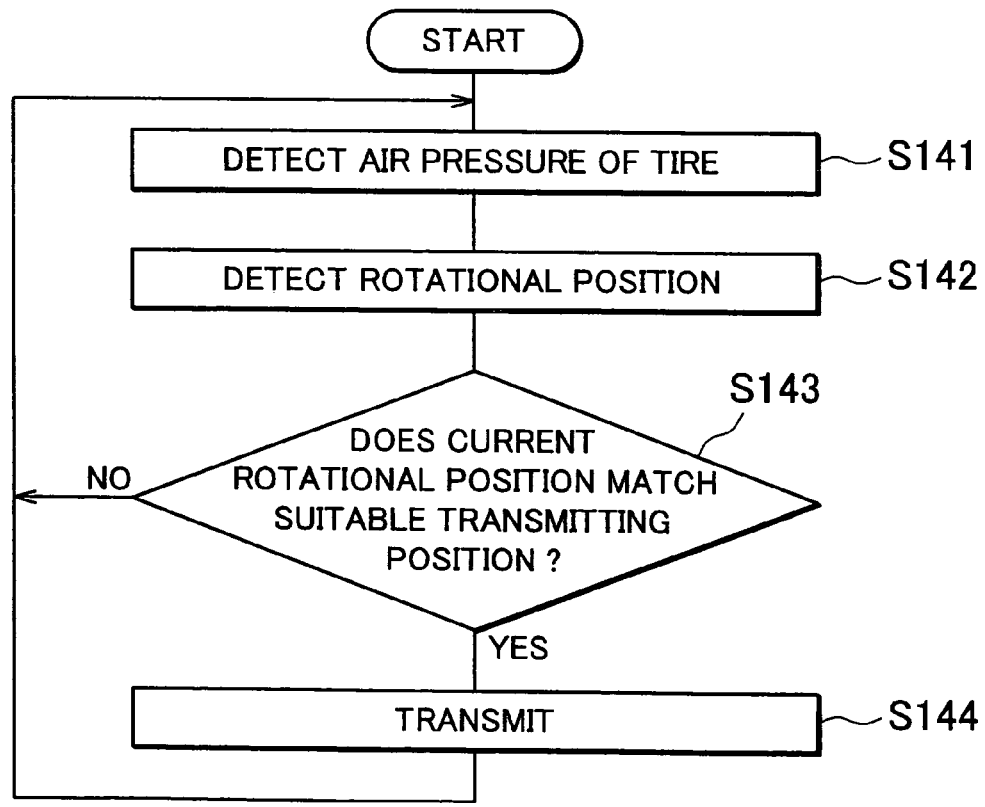
FIG. 14 is a flowchart schematically illustrating the content of a transmission control program stored in advance in the ROM shown in FIG. 13.

FIG. 14 is a flowchart schematically illustrating the content of a transmission control program run by the data processing portion 124. When this transmission control program is executed by the computer 140, the tire air pressure is first detected based on an output signal from the pressure sensor 130 in step S141.

Next in step S142, the rotational position of the tire is detected based on an output signal from the position sensor 200.

The output signal from the position sensor 200 changes in a sinusoidal waveform as the rotation angle of the tire increases. In FIG. 12A, when the tire is in the position indicated by 90 degrees, the output signal assumes one extreme value, and when the tire is in the position indicated by 270 degrees, the output signal assumes another extreme value. Therefore, it is possible to detect whether the rotation angle of the tire is 90 degrees, 270 degrees, or another angle other than those two based on the output signal from the position sensor 200.

In other words, because the output signal from the position sensor 200 may include a component that reflects the angular acceleration of the wheel as disturbance, it is preferable that such a component be eliminated. For example, it is preferable to focus on the fact that the component is a high frequency component with respect to normal components, and carry out local filter processing on the output signal from the position sensor 200.

Next in step S143 in FIG. 14, it is determined whether the detected rotational position, i.e., the current rotational position, matches a suitable transmitting position which is suitable for transmission from the detection unit 110. In this exemplary embodiment, the suitable transmitting position (which corresponds to the transmission timing of the detection unit 110) is set beforehand, for example, as a position where the rotational position of the tire is 90 degrees, as shown in both FIGS. 12A and 15.

Figure 15:
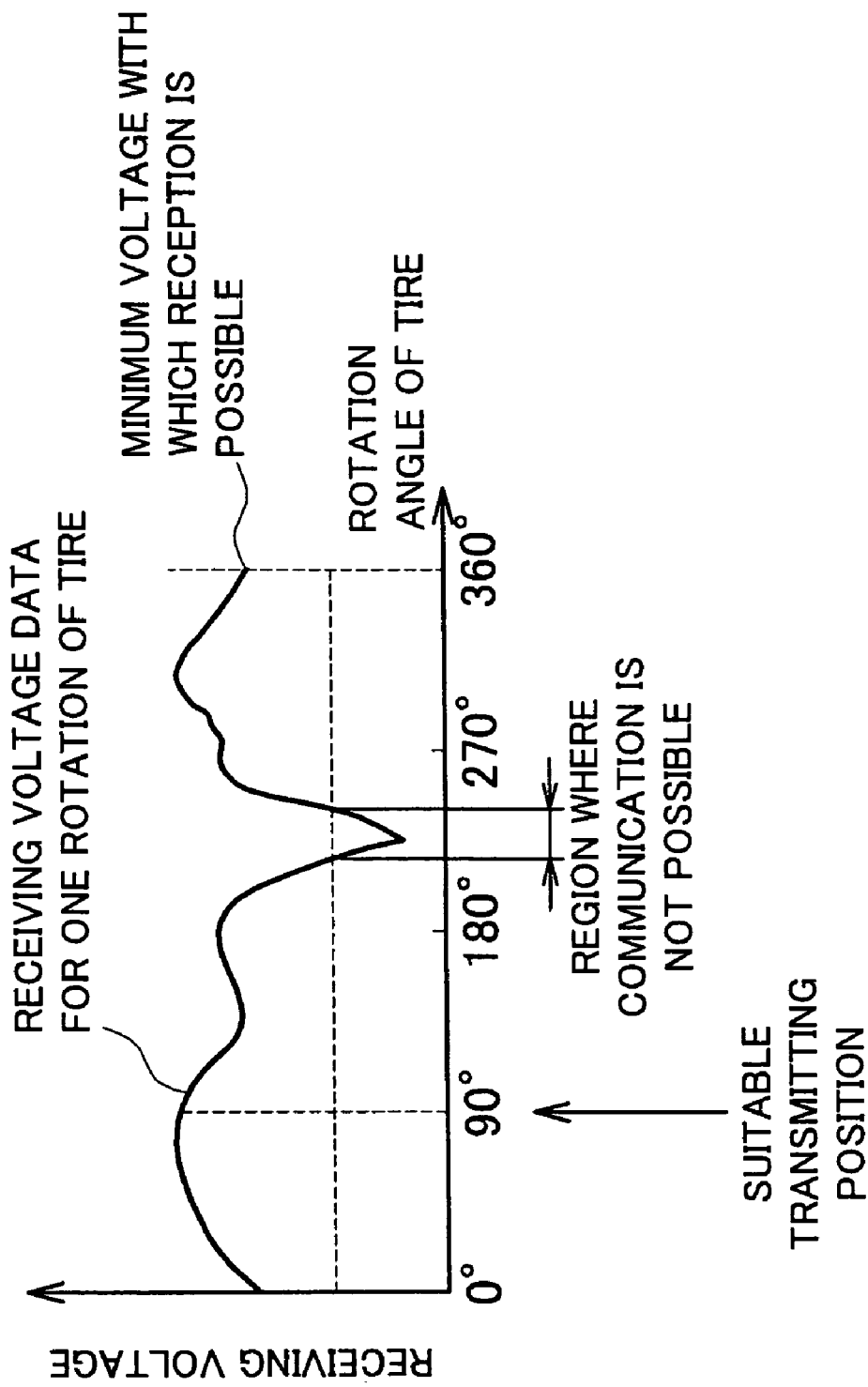
FIG. 15 is a graph illustrating one example of a change in the receiving voltage of a receiver on the vehicle body side during one rotation of a tire.

The suitable transmitting position is set beforehand to a value in a range where the actual receiving voltage exceeds a minimum voltage at which normal reception is possible, within the total range of the rotation angles of the tire, based on the reception characteristics indicated by the graph in FIG. 15, i.e., based on the manner in which the receiving voltage of the processing apparatus 112 changes throughout one rotation of the tire.

If it is determined that the current rotational position does not match the suitable transmitting position, the determination in step S143 is no. The routine then returns to step S141 without the detection unit 110 transmitting a signal, and the tire air pressure is detected again. If it is determined that the current rotational position does match the suitable transmitting position, the determination in step S143 is yes and the detection unit 110 transmits a signal in step S144. The routine then returns to step S141 where the tire air pressure is detected again.

Accordingly, in the exemplary embodiment, the detection unit 110 transmits a signal with each rotation of the wheel at a transmission timing at which the rotational position of the wheel matches the suitable transmitting position.

In the exemplary embodiment, the detection unit 110 determines the transmission timing and sends the signal without waiting for a transmission request from the processing apparatus 112. Also in the exemplary embodiment, the position sensor 200 used for determining the transmission timing of the detection unit 110 is mounted on the wheel side.

Accordingly, in this exemplary embodiment the detection unit 110 is more autonomous than both a transmitter of a type that starts transmission in response to a transmission request signal from the processing apparatus 112, and a transmitter of a type in which at least a portion of the position sensor 200 is mounted on the vehicle body side.

Further in the exemplary embodiment, the position sensor 200 is housed within the detection unit 110. Alternatively, however, the position sensor 200 may be located away from the detection unit 110, in a position different from that of the detection unit 110 in relation to the rotational position of the wheel.

As described above, in the second exemplary embodiment, the processing apparatus 112 constitutes one example of the body-side communication device and the detection unit 110 constitutes one example of the wheel-side communication device.

Further, the position sensor 200 in the second exemplary embodiment constitutes one example of the rotational position detecting device. The wheel speed sensor 90 in the exemplary embodiment can be replaced with the position sensor 200 described in the second embodiment.

Although the invention has been described herein with reference to specific embodiments, many modifications and variations therein will readily occur to those skilled in the art. Accordingly, all such variations and modifications are included within the intended scope of the invention.

What is claimed is:

1. A communication system for communicating between a tire/wheel assembly and a vehicle body, comprising:
   a wheel-side communication device mounted on the tire/wheel assembly so as to rotate together with the tire/wheel assembly;
   a body-side communication device mounted in a fixed position to the vehicle body;
   a rotational position detecting device that detects a rotational position of the tire/wheel assembly,
   wherein the body-side communication device transmits a signal to the wheel-side communication device at a body-side transmission timing in accordance with the rotational position of the tire/wheel assembly; and
   a body-side transmission timing determining device that sets the body-side transmission timing based on a relationship between i) the rotational position detected by the rotational position detecting device and ii) a received signal level which is a level of a signal received by one of the body-side communication device and the wheel-side communication device from the other.

2. The communication system according to claim 1, wherein:
   the body-side transmission timing determining device i) has a level obtaining portion that obtains a received signal level for each one of a plurality of rotational positions detected by the rotational position detecting device, and ii) determines the body-side transmission timing based on a distribution of the plurality of received signal levels, each of which is obtained for a corresponding rotational position.

3. The communication system according to claim 2, wherein the level obtaining portion obtains the received signal level for the rotational position when at least one of i) a rotation speed of the tire/wheel assembly is equal to, or less than, a reference speed, and ii) the rotation speed of the tire/wheel assembly is maintained constant.

4. The communication system according to claim 2, wherein the body-side transmission timing determining device comprises:
   a position determining portion that determines, as the optimum receiving position for the wheel-side communication device, the rotational position for which the substantially highest value was obtained from among the plurality of received signal levels obtained for each one of the plurality of rotational positions, and
   a timing determining portion that determines the body-side transmission timing to be a timing at which the wheel-side communication device receives a signal from the body-side communication device when the actual rotational position of the tire/wheel assembly substantially matches the determined optimum receiving position.

5. The communication system according to claim 4, wherein the body-side transmission timing is the timing at which a start transmission command to start transmitting to the body-side communication device is issued, and the timing determining portion determines the body-side transmission timing based on at least one of i) the rotational speed of the tire/wheel assembly and ii) a transmission response time, which is the period of time from when the start transmission command is issued until the body-side communication device outputs the actual signal in response to that command.

6. The communication system according to claim 1, wherein the wheel-side communication device transmits the signal to the body-side communication device at a wheel-side transmission timing based on the rotational position of the tire/wheel assembly.

7. The communication system according to claim 6, further comprising:
   a wheel-side transmission timing determining device which determines, based on an actual reception timing at which the wheel-side communication device actually received a signal that was transmitted by the body-side communication device at the body-side transmission timing, a wheel-side transmission timing at which the wheel-side communication device is to transmit a signal to the body-side communication device in response to the signal that was transmitted by the body-side communication device at the body-side transmission timing.

8. The communication system according to claim 7, wherein the wheel-side transmission timing is the timing at which the start transmission command to start transmitting to the wheel-side communication device is issued, and the wheel-side transmission timing determining device includes a timing determining portion which determines the wheel-side transmission timing based on i) a period of time during which the actual rotational position of the tire/wheel assembly matched the optimum receiving position, ii) a period of time that it takes for the tire/wheel assembly to rotate once, and iii) a transmission response time, which is the period of time from when the start transmission command is issued until the wheel-side communication device actually starts to output the signal in response to the start transmission command.

9. The communication system according to claim 8, wherein the wheel-side transmission timing determining device is mounted to the vehicle body, and the wheel-side transmission timing determining device includes a secondary signal transmitting portion that appends a secondary signal indicative of the determined wheel-side transmission timing to a main signal to be transmitted from the body-side communication device at the body-side transmission timing and then transmits that secondary signal together with the main signal to the wheel-side communication device.

10. The communication system according to claim 7, wherein the tire/wheel assembly comprises a tire mounted on a wheel, and the communication system further includes a tire state quantity sensor which is mounted on the tire/wheel assembly and detects a tire state quantity, and the wheel-side communication device transmits a signal indicative of the tire state quantity detected by the tire state quantity sensor to the body-side communication device.

11. The communication system according to claim 1, wherein the rotational position detecting device includes i) a rotating body that rotates together with the tire/wheel assembly and that has a plurality of target detection positions lined up at equidistant intervals along the circumference of a circle, and ii) a detecting object that is provided at a fixed position on the vehicle body and individually detects the passing of the each one of the plurality of target detection positions.

12. The communication system according to claim 11, wherein the detecting object is a wheel speed sensor that detects an angular velocity of the tire/wheel assembly as a wheel speed.

13. The communication system according to claim 1, wherein the signal to be transmitted from the body-side communication device to the wheel-side communication device includes a request signal which requests that a signal indicative of information relating to the tire/wheel assembly be transmitted from the wheel-side communication device to the body-side communication device.

14. The communication system according to claim 1, wherein the signal to be transmitted from the body-side communication device to the wheel-side communication device includes an electric energy signal which generates electric energy to be consumed by the wheel-side communication device.

15. The communication system according to claim 1, wherein the rotational position detecting device includes an acceleration sensor which i) has directionality, ii) detects an acceleration, iii) is mounted to the tire/wheel assembly at a fixed position away from a rotational axis of the tire/wheel assembly, and iv) rotates together with the tire/wheel assembly around the rotational axis thereof.

16. The communication system according to claim 15, wherein the fixed position of the acceleration sensor is a position from which the acceleration sensor detects the acceleration in a direction perpendicular to a direction in which centrifugal acceleration is generated in the acceleration sensor as the tire/wheel assembly rotates.

17. A communication system for communicating between a tire/wheel assembly and a vehicle body, comprising:
  a wheel-side communication device mounted on the tire/wheel assembly so as to rotate together with the tire/wheel assembly;
  a body-side communication device mounted in a fixed position to the vehicle body; and
  a rotation state amount sensor mounted on the tire/wheel assembly so as to detect a rotation state amount of the tire/wheel assembly,
  wherein the wheel-side communication device transmits a signal to the body-side communication device at a wheel-side transmission timing in accordance with a rotational position of the tire/wheel assembly and based on the rotation state amount of the tire/wheel assembly; and
  wherein the rotation state amount sensor includes an acceleration sensor which i) has directionality, ii) detects an acceleration, iii) is mounted to the tire/wheel assembly at a fixed position away from a rotational axis of the tire/wheel assembly, and iv) rotates together with the tire/wheel assembly around the rotational axis thereof.

18. The communication system according to claim 17, wherein the fixed position of the rotation state amount sensor is a position from which the acceleration sensor detects the acceleration in a direction perpendicular to a direction in which centrifugal acceleration is generated in the acceleration sensor as the tire/wheel assembly rotates.

19. A communication method for communicating between a tire/wheel assembly and a vehicle body, comprising:
  detecting a rotational position of the tire/wheel assembly; and
  transmitting a signal, at a body-side transmission timing in accordance with the rotational position of the tire/wheel assembly, from the body-side communication device mounted in a fixed position to the vehicle body to the wheel-side communication device mounted on the tire/wheel assembly so as to rotate together with the tire/wheel assembly,
  wherein the body-side transmission timing is set based on a relationship between i) the rotational position detected and ii) a received signal level which is a level of a signal received by one of the body-side communication device and the wheel-side communication device from the other.

20. The communication method according to claim 19, wherein the signal is transmitted from the wheel-side communication device to the body-side communication device at a wheel-side communication timing in accordance with a rotational position of the tire/wheel assembly.

21. The communication method according to claim 20, further comprising:
  determining, based on an actual reception timing at which the wheel-side communication device actually received a signal that was transmitted by the body-side communication device at the body-side transmission timing, a wheel-side transmission timing at which the wheel-side communication device is to transmit a signal to the body-side communication device in response to the signal that was transmitted by the body-side communication device at the body-side transmission timing.

* * * * *